United States Patent [19]

Holt et al.

[11] Patent Number: 4,780,047

[45] Date of Patent: Oct. 25, 1988

[54] ADVANCED SERVO MANIPULATOR

[75] Inventors: William E. Holt, Knoxville; Daniel P. Kuban, Oak Ridge; H. Lee Martin, Knoxville, all of Tenn.

[73] Assignee: Martin Marietta Energy Systems, Inc., Oak Ridge, Tenn.

[21] Appl. No.: 720,449

[22] Filed: Apr. 5, 1985

[51] Int. Cl.⁴ ............................ B25J 9/08; B25J 9/06
[52] U.S. Cl. ............................................ 414/730; 414/8; 901/15; 901/23; 901/26; 901/27; 901/28
[58] Field of Search ................... 901/19, 21, 22, 23, 901/24, 25, 26, 27, 28, 29, 50; 414/1, 2, 3, 4, 5, 6, 7, 8, 730, 735

[56] References Cited

U.S. PATENT DOCUMENTS

| | | | |
|---|---|---|---|
| 2,978,118 | 4/1961 | Goertz et al. | 414/4 |
| 4,047,448 | 9/1977 | Pardo et al. | 901/29 X |
| 4,370,091 | 1/1983 | Gagliaridi | 901/29 X |
| 4,460,302 | 7/1984 | Moreau et al. | 414/590 X |
| 4,501,522 | 2/1985 | Causer et al. | 901/25 X |
| 4,531,884 | 7/1985 | Russell | 901/26 X |
| 4,586,868 | 5/1986 | Nakashima et al. | 901/26 X |
| 4,606,695 | 8/1986 | Lenz | 901/23 X |
| 4,717,303 | 1/1988 | Kawai | 901/19 X |

FOREIGN PATENT DOCUMENTS

| | | | |
|---|---|---|---|
| 180560 | 5/1986 | European Pat. Off. | 901/15 |
| 2085185 | 1/1970 | France | 901/17 |
| 453292 | 2/1975 | U.S.S.R. | 901/17 |
| 763082 | 7/1977 | U.S.S.R. | 414/735 |
| 1455782 | 11/1976 | United Kingdom | 901/19 X |

OTHER PUBLICATIONS

"Industrial Robots: Getting Smarter All The Time", Instruments and Control Systems, Jul. 1982, pp. 32–38.
"Accessible Region and Synthesis of Robot Arms", Journal of Mechanical Design, Oct. 1981, vol. 103, pp. 803–811.
"MA22-A Compact Bilateral Servo Masterslave Manipulator"-*Proceedings of 20th Conference on Remote Systems Technology,* 1972, pp. 296–302.
*Advanced Servomanipulator Design Study,* Martin Marietta Corp., Denver, CO., Feb. 1981, "Final Report".
Teleoperator Systems Corp., Bohemia, New York, Jan. 1981, "Conceptual Design Report for the HEF".

*Primary Examiner*—Robert J. Spar
*Assistant Examiner*—P. McCoy Smith
*Attorney, Agent, or Firm*—James M. Spicer; Bruce M. Winchell

[57] ABSTRACT

An advanced servo manipulator has modular parts. Modular motor members drive individual input gears to control shoulder roll, shoulder pitch, elbow pitch, wrist yaw, wrist pitch, wrist roll, and tong spacing. The modules include a support member, a shoulder module for controlling shoulder roll, and a sleeve module attached to the shoulder module in fixed relation thereto. The shoulder roll sleeve module has an inner cylindrical member rotatable relative to the outer cylindrical member, and upon which a gear pod assembly is mounted. A plurality of shafts are driven by the gears, which are in turn driven by individual motor modules to transmit rotary power to control elbow pitch as well as to provide four different rotary shafts across the bendable elbow joint to supply rotary motive power to a wrist member and tong member.

4 Claims, 24 Drawing Sheets

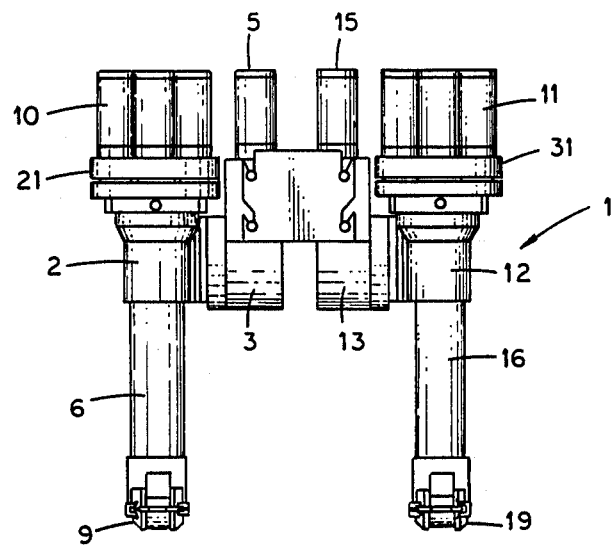
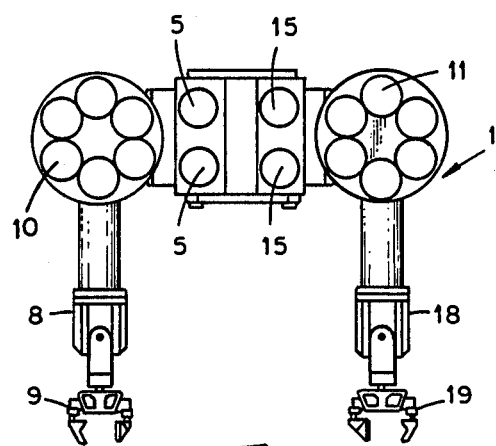
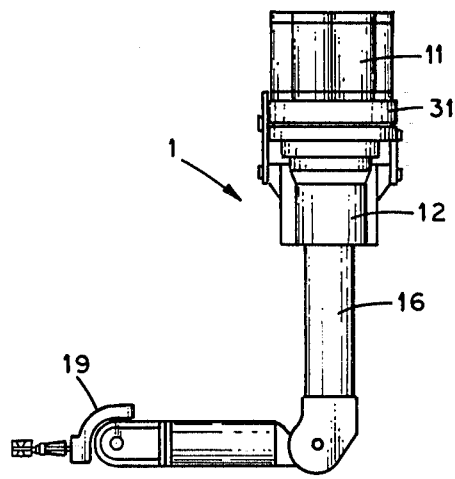

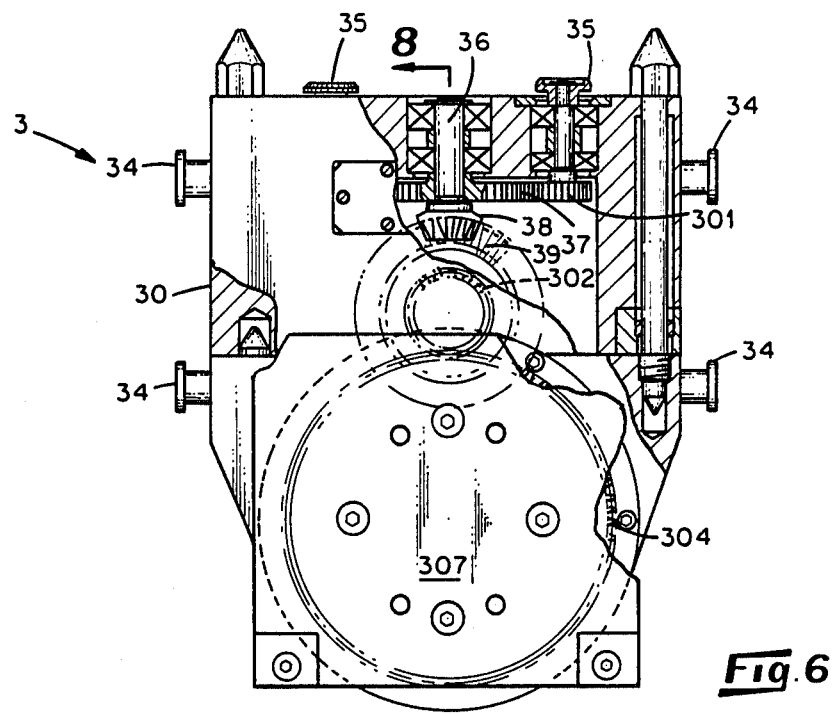
Fig. 6
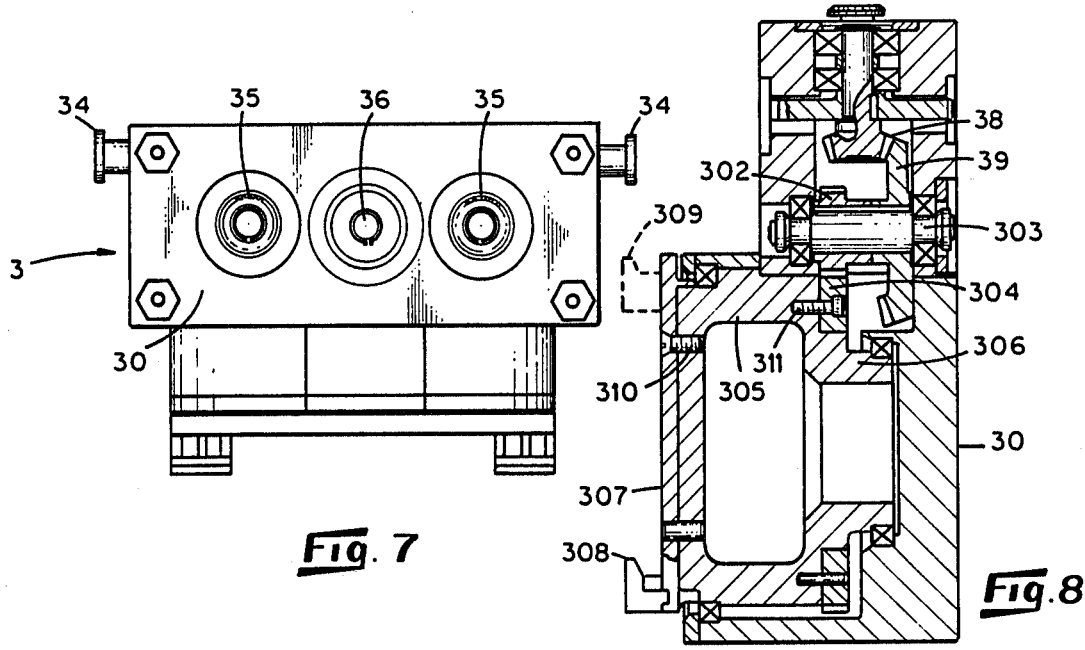
Fig. 7
Fig. 8

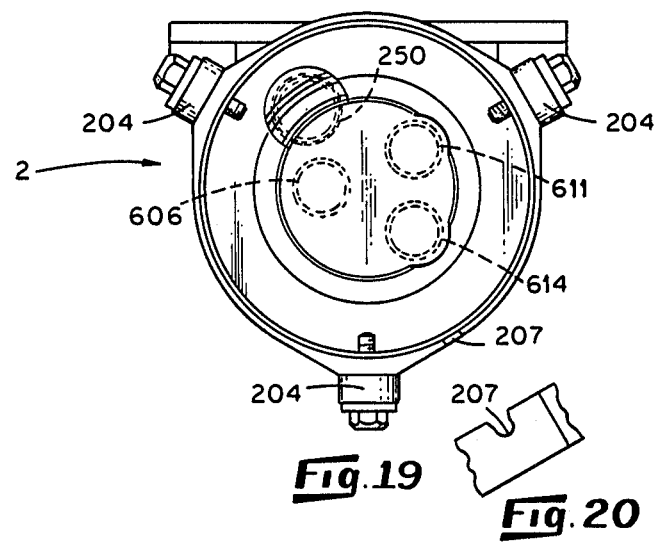
Fig. 19
Fig. 20
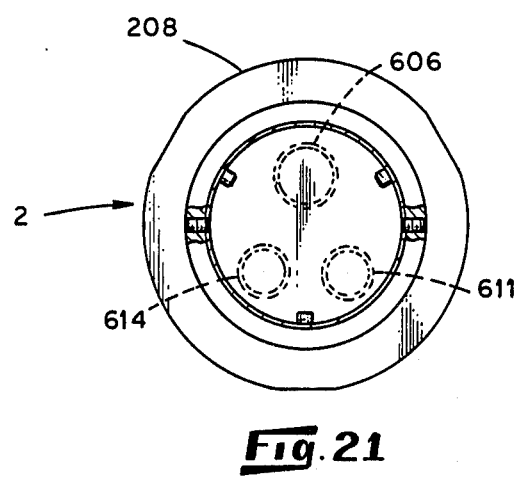
Fig. 21

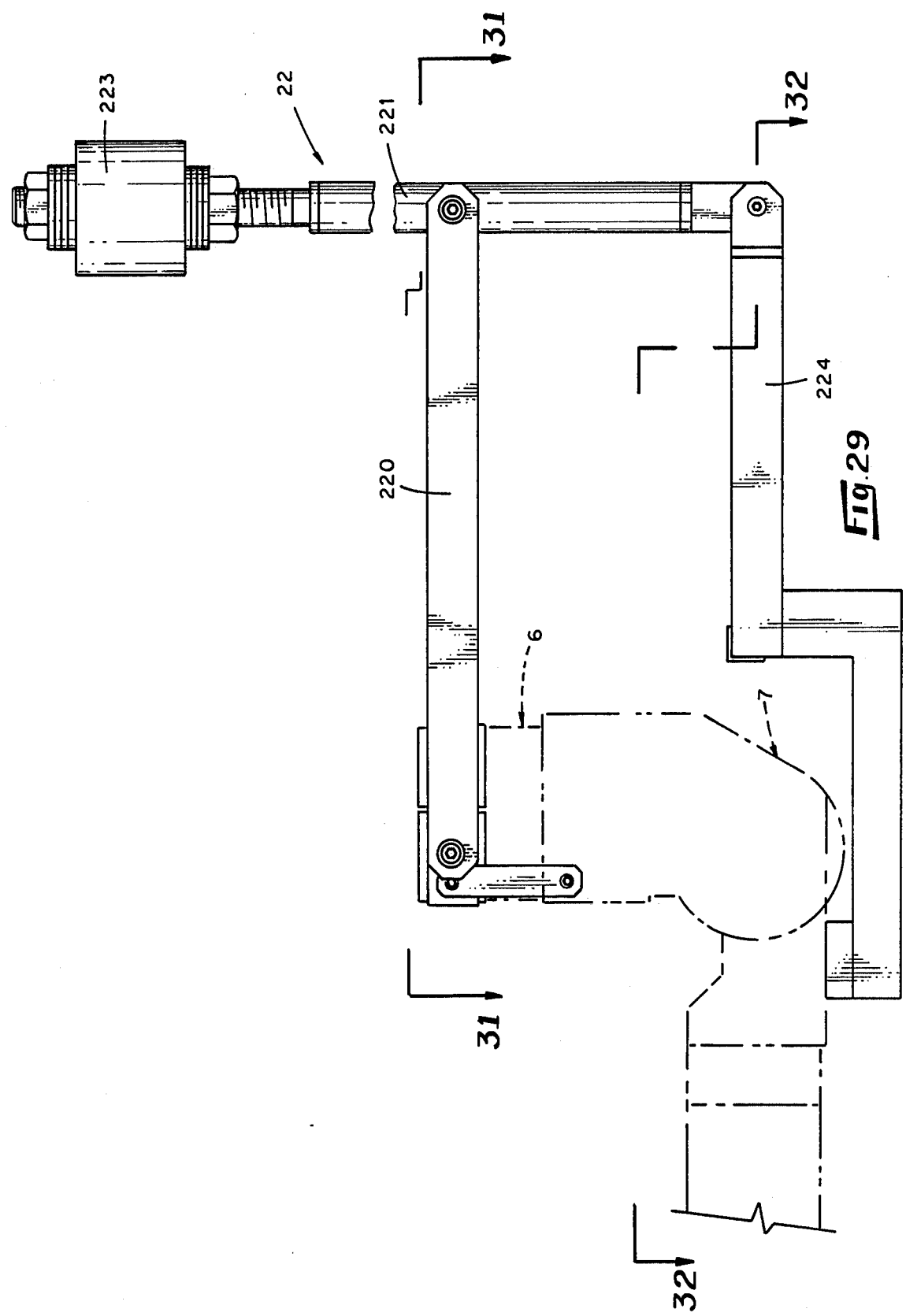

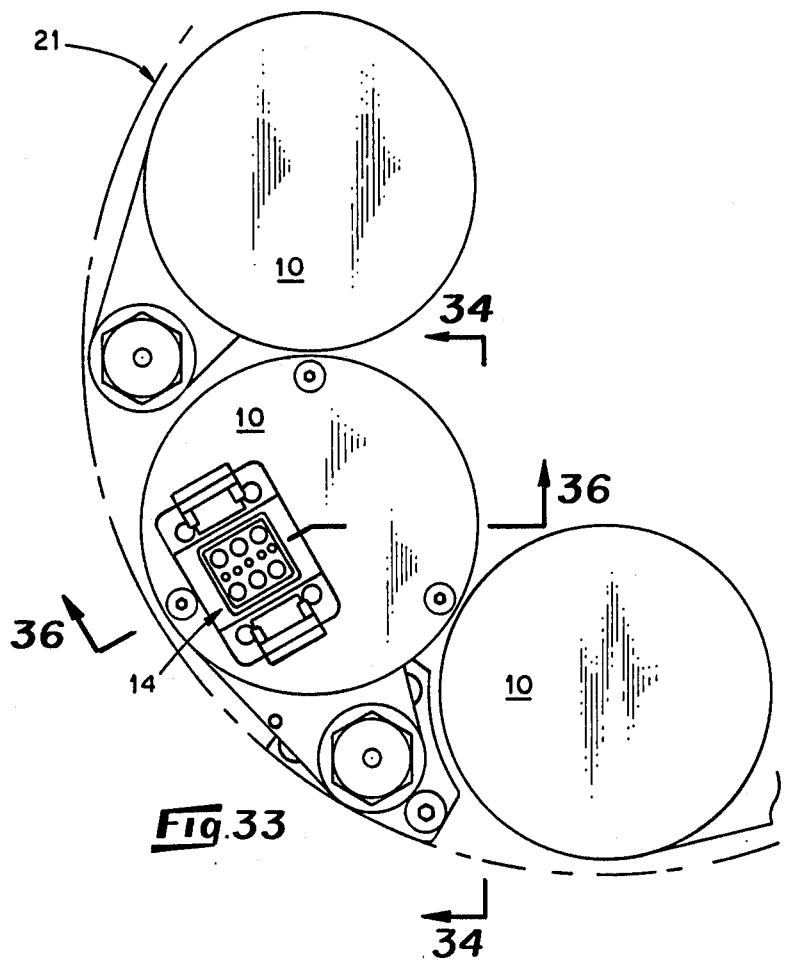
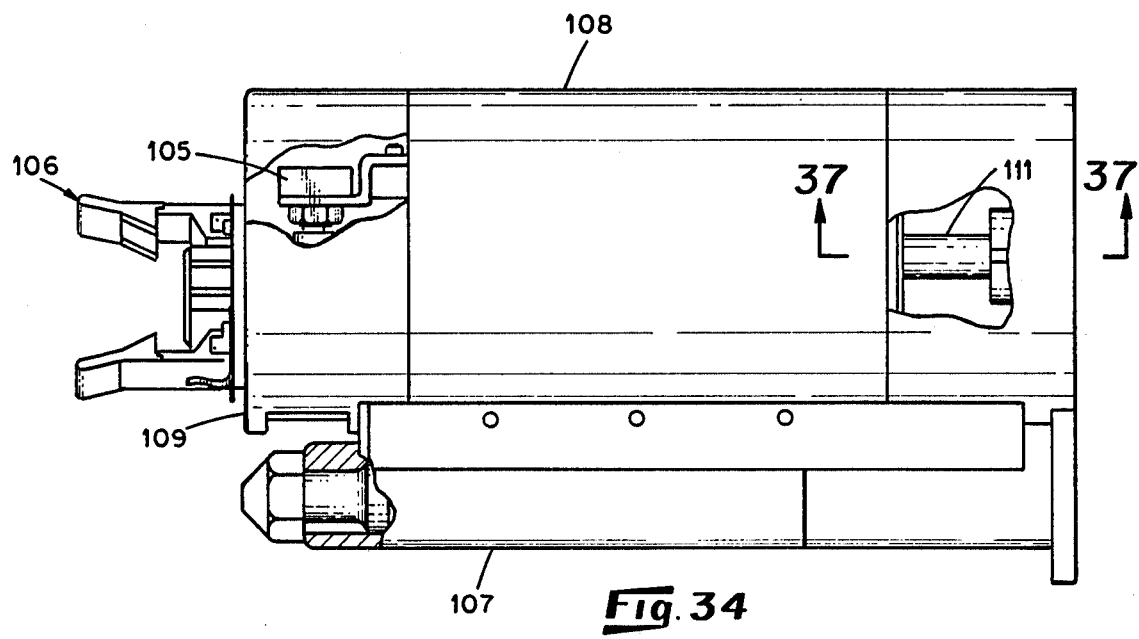

ADVANCED SERVO MANIPULATOR

BACKGROUND OF THE INVENTION

1. Field of the Invention and Contract Statement

The present invention relates to an Advanced Servo Manipulator. The United States Government has rights in this invention pursuant to Contract No. W-7405-ENG-26 between the U.S. Department of Energy and Union Carbide Corporation.

2. Discussion of Background and Prior Art

The field of robotics is a relatively new field, wherein generally simple robotic designs have been well-known. For example, a type of simple robot is a pair of pincers which are automatically or manually operable.

Generally, servo manipulators are considered to constitute a unique field of robots which allow real-time human control of robot motion. Some of these are constructed of intricately fashioned element parts which run along the entire length of, for example, a robotic arm and wrist. It is very desirable for some applications that the individual component elements be grouped in a subassembly, e.g. the wrist, the "forearm", the elbow, and shoulder, which is modular and interchangeable with other subassemblies. This would permit relatively easy maintenance by replacement of a single module at a time. Also, in some applications it is desirable that an anthropomorphic operating position be maintained for avoiding horizontal obstacles and for facilitating reaching into equipment.

In one type of prior art device, from the *Proceedings of 20th Conference on Remote Systems Technology*, 1972, entitled "M822-A COMPACT BILATERAL SERVO MASTER-SLAVE" authored by Carl Flatau, Jean Vertut, Jean-Pierre Guilbaud, Jean-Claude Germond, and Charles Glachet, shows a type of robotic device employing pulleys and having generally a non-anthropomorphic stance. That is, the "upper arm" portions are generally intended to be horizontally disposed and the "lower arm" portions are generally vertically disposed in both directions, unlike a human stance wherein the upper arms are generally disposed in a vertical direction and lower arms are disposed horizontally. In the robotic device described in the above proceedings, the wrist bends an rolls in two directions (pitch and roll) as shown in FIG. 4 of the article. The device shown, however, does not employ modular cmponents, nor is it capable of being modularized.

SUMMARY OF THE INVENTION

An object of the present invention is to provide an advanced servo manipulator having an anthropomorphic stance for operation in remote environments.

Another object of the present invention is to provide an advanced servo manipulator having modular, easily changable, components for ease of assembly and repair.

Still another object of the present invention is to provide an advance servo manipulator having seven different degrees of freedom of movement, including a shoulder roll, shoulder pitch, elbow pitch, wrist yaw, wrist pitch, wrist roll, and tong spacing.

Another further object of the invention is to provide an advanced servo manipulator which has two arms and which is all gear driven, gear driving components (motors) being attached in driving relationship at a point generally away from the elbow and wrist portions of the manipulator.

An anthropomorphic-type servo manipulator is adapted to perform maintenance tasks in a remotely operated and maintained fuel reprocessing facility. The manipulator is so designed that it can be subdivided into modules that can be replaced with other modules in situ. Remote disassembly and replacement of individual modules are facilitated by means of easily separable joints between adjacent modules. Easily separable joints between modules are made possible by using all gear and torque tube force transmission which allows subdivision at gear interfaces.

Generally, rotary force supplying elements (motors) are provided at a location atop each shoulder portion. This permits easy replacement of these units. Elbow modules, wrist modules, shoulder modules, roll sleeve modules (at an "upper arm" location), and gear pod modules are provided. Also, tong pairs are provided at the end of each wrist, the spacing and force of the tong members being controllable.

Thus, seven degrees of freedom are provided in a robotic system having an anthropomorphic stance. This includes tong spacing, wrist roll, wrist pitch, wrist yaw, elbow pitch, shoulder pitch, and shoulder roll. All of the components are modularized and connected by means of easily separatable joints so as to be quickly replaceable in the event of a break down or for routine preventive maintenance of various parts. Since some parts are more likely to fail than others, modularization and the use of easily separable joints permits faster repair, and reduced cost of repair since only a single module is changed. Furthermore, such modules can be replaced by nearby identical advanced servo manipulators of the present invention, thereby avoiding the necessity of human contact with the device once it has been installed.

BRIEF DESCRIPTION OF THE DRAWINGS

FIG. 3 is a front elevational view of the apparatus of FIG. 1;

FIG. 4 is a top elevational view of the device as shown in FIG. 3;

FIG. 5 is a side elevational view taken from the right of FIG. 3;

FIG. 6 is a side elevational view of element 3 shown in FIG. 2;

FIG. 7 is a top view of the apparatus shown in FIG. 6;

FIG. 8 is a front cross-sectional view of the device of FIG. 6 taken from the right side;

FIG. 14A is a side sectional view taken from the right of FIG. 14, showing a spacing member;

FIG. 19 is a top elevational view of the apparatus of FIG. 17;

FIG. 20 is side view taken along an indicated angle of the device shown in FIG. 19;

FIG. 21 is a sectional view taken along line 21—21 of FIG. 18;

FIG. 29 is a side elevational view of a counterbalance assembly which is operable with a portion of the elbow module assembly to counterbalance the weight of the forearm wrist module and tongs;

FIG. 33 is a top elevational view of a drive motor module assembly as seen mounted atop the gear pod assembly of the present invention;

FIG. 34 is a side view partially in section taken along line 34—34 of FIG. 33;

DETAILED DESCRIPTION OF THE INVENTION

Figure 1:
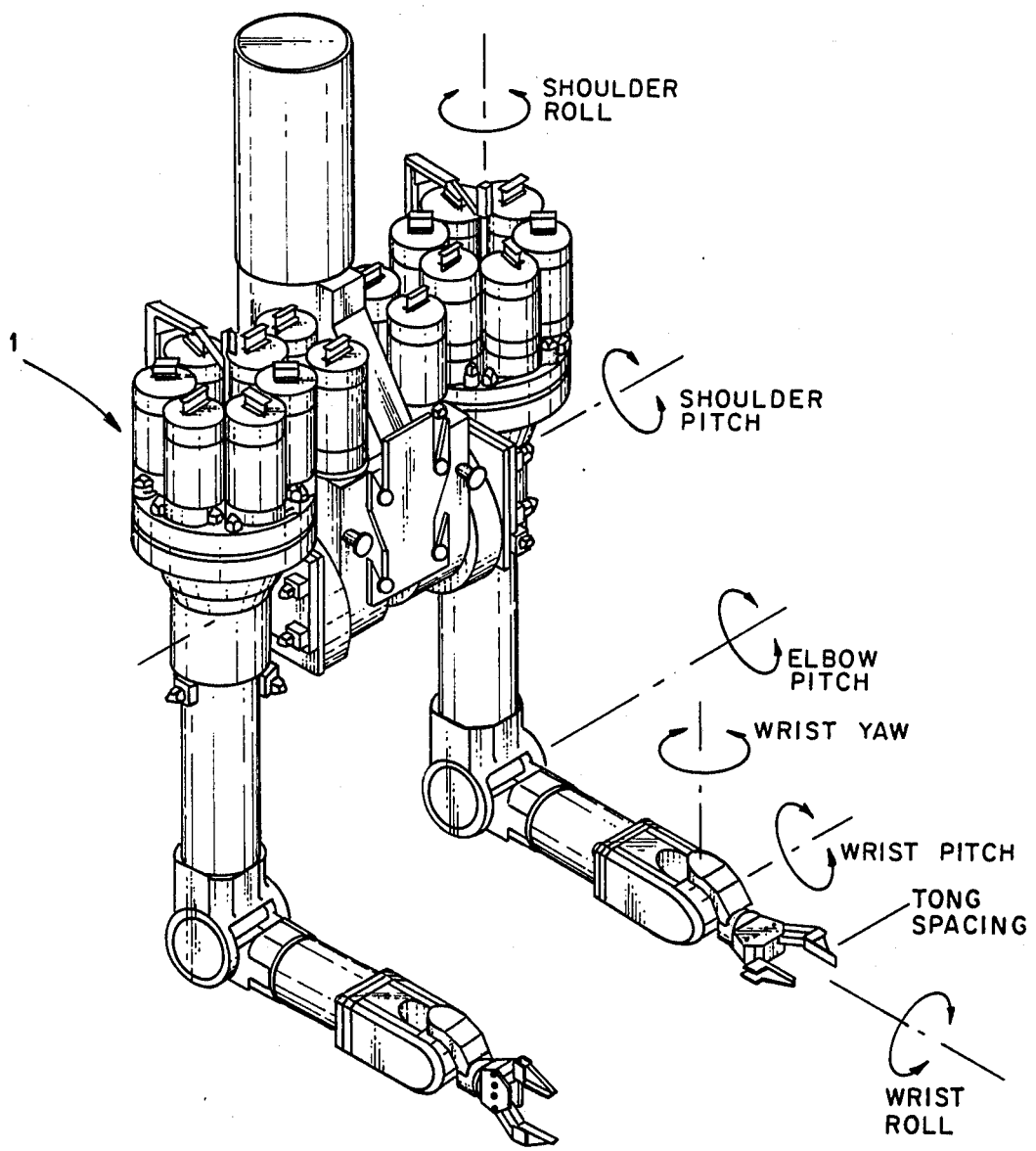
FIG. 1 is a perspective view of the assembled servo manipulator of the present invention showing the seven degrees of freedom possible.

FIG. 1 is a perspective view of the invention showing the advanced servo manipulator 1 and the seven degrees of freedom possible in its operation.

The seven degrees of freedom illustrated in FIG. 1 include the following: tong spacing; wrist roll; wrist pitch; wrist yaw; elbow pitch; shoulder pitch; and shoulder roll.

Figure 2:
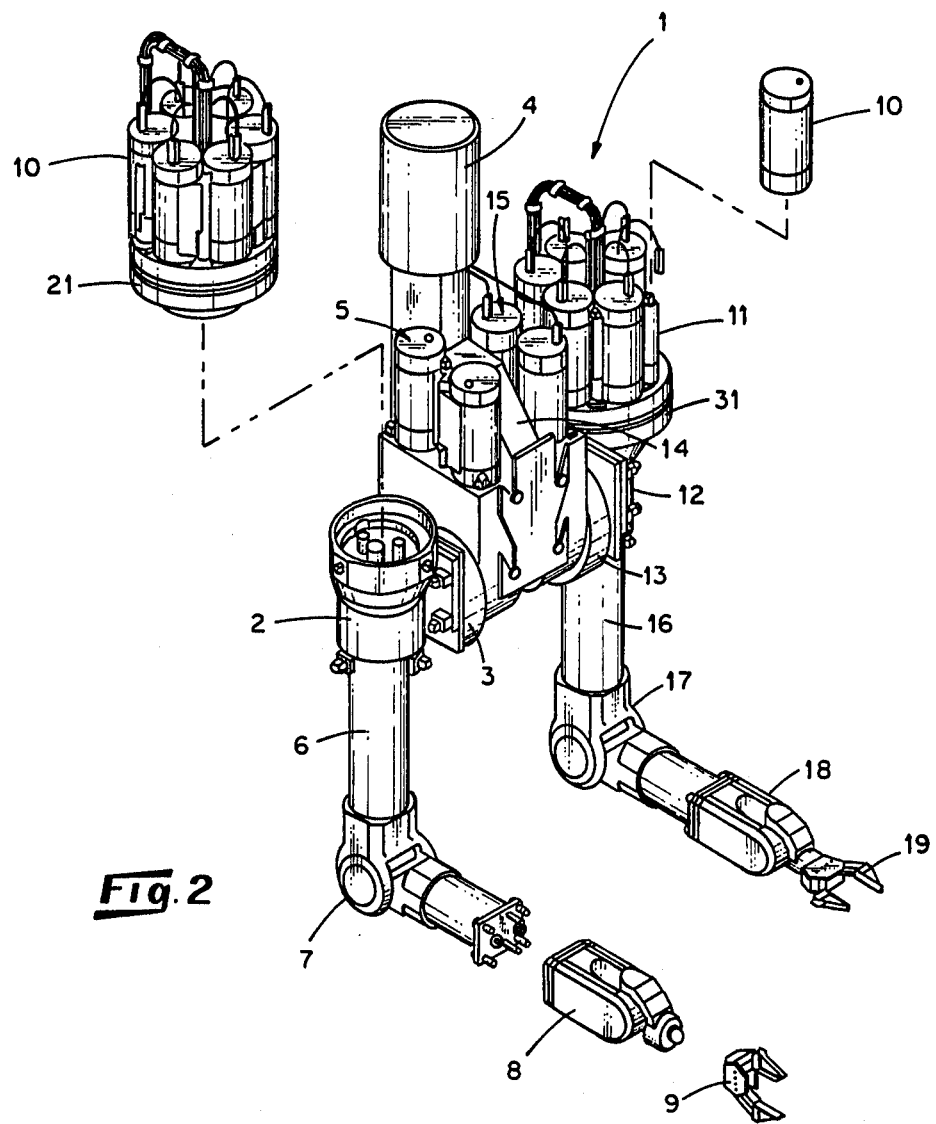
FIG. 2 is an exploded assembly view of the components shown in perspective view of the device of FIG. 1.

FIG. 2 is an isometric exploded assembly drawing of the advanced servo manipulator 1. Here, the parts are individually numbered for reference and are shown separated for understanding of the assembly. A gear pod module 21 supports individual drive motor module assemblies 10. Each of the assemblies 10 is identical and therefore replacable in modular fashion. The gear pod module is attachable to the left hand roll sleeve module 2.

The module 2 is fixedly connected to a portion of the left shoulder module assembly 3, and the module 2 also supports the upper arm portion 6 of elbow module 7. As used, the words "left hand" and "right hand" refer to the position of parts on FIG. 2, and do not refer to the orientation of the servo manipulator itself. That is, "left" in FIG. 2 simply refers to a part which is disposed to the left of its corresponding and identical counterpart on the right side of the drawing.

The elbow module 7 is connectable to the wrist module 8. The wrist module 8 in turn supports tongs 9. A structural backing member 4 is provided to externally support the advanced servo manipulator of the present invention. A shoulder drive pod assembly 5 is supported above the shoulder module assembly 3, and provides rotary motive power for the shoulder module assembly 3.

The corresponding modular units on the right side of FIG. 2 are as follows. The right hand drive motor module assembly 11 is connected to the right hand gear pod module 31 which in turn is connected to the roll sleeve module 12. The right shoulder module assembly 13 supports the right hand roll sleeve module 12. A right hand shoulder drive pod assembly 15 drives the right hand shoulder module assembly 13. A central supporting block 14 is provided between the opposing pairs of modular units.

The roll sleeve module 12 supports the right hand upper arm portion 16 of elbow module 17. Elbow module 17 supports the right hand wrist module 18, which in turn supports the right hand tongs 19. An individual drive motor module is designated as numeral 10 in FIG. 2.

FIG. 3 is a front elevational view of the unit shown in FIG. 2. FIG. 4 is a top elevational view of the device of FIG. 3.

FIG. 5 is a side elevational view taken from the right of FIG. 3, showing the relationship of the parts. The parts are numbered correspondingly to FIG. 2, for ease of identification of the parts.

FIG. 6 is a side elevational view of module 3 of FIG. 2. It is partly broken away from view of the internal components. A pair of input spur gear couplings (couple to motor shaft) 35, driven by the individual motor modules 10, provide rotary motive power to the module 3. Each individual spur gear coupling 35 is supported by bearings (unnumbered) having a pinion member 301 rotating therewith. Pinion 301 in turn drives a driven toothed gear 37. Gear 37 is driven by both of the gears 35, to balance the forces involved so that there is no net force other than rotary force acting upon shaft 36 of the gear 37. Four head projections 34 are visible in FIG. 6, and are used for mounting other components thereon.

A mounting block (upper housing) 30 supports all of the elements of the module 3. The toothed gear 37 has a bevel pinion 38 mounted on the same shaft which is arranged for driving a bevel gear 39. A toothed gear 302 rotates together with bevel gear 39 and is integral therewith, being connected fixedly thereto. Gears 302 and 39 are connected together by a bearing-mounted central shaft 303.

FIG. 7 is a top elevational view of the module 3 of FIG. 6. This clearly shows the arrangement of the gears 35 and gearshaft 36.

FIG. 8 is side view taken in section of the device of FIG. 6. Here, it is seen that the ring gear 304 is fixedly connected with a large cylindrical body 305, and the axis of the ring gear 304 is the axis about which shoulder pitch occurs. A neck portion 306 is formed in the body 305. This is supported by bearings as are all rotating parts. These bearings permit rotary, but not translational movement. If other frictionless-type of bearings are desired, they can be provided in such as contemplated as being within the scope of the present invention. For example, a Teflon bearing, an air bearing, magnetic bearings, or the like could be used in place of the ball bearings for other application.

A front plate 307 is fixedly connected to the body 305. A remote positioner 308 is fixedly attached to the plate 307, and projects beyond it. In dotted outline, the remote positioner 308 is indicated at 309 in FIG. 8 as an alternate position for evaluation. Typical connecting screws 310 and 311 are shown for connecting, respectively, the plate 307 and the ring gear 304 to the body 305.

Figure 9:
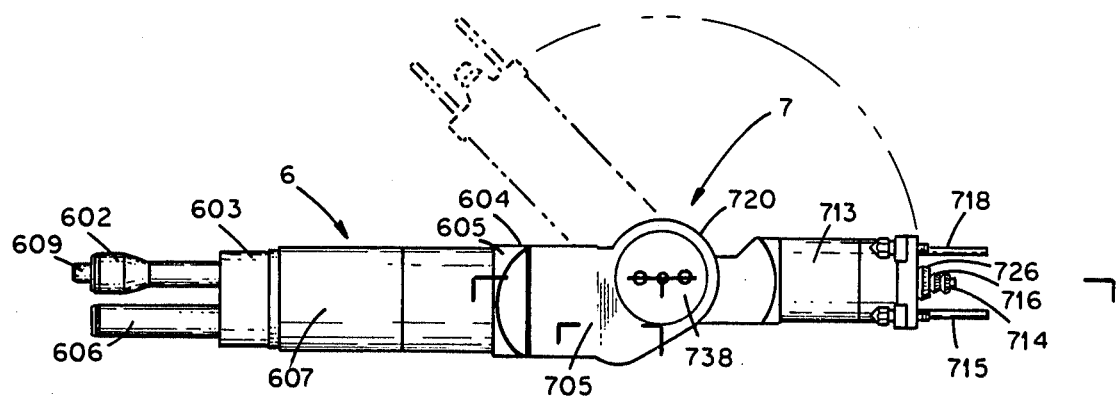
FIG. 9 is a side elevational view of element 7 of FIG. 2.

FIG. 9 is a side elevational view of element 7 of FIG. 2. The element 7 has an upper arm portion 6 which is connected to the roll sleeve module 2 and which three shafts visible in FIG. 9 as 602, 609, and 606, with shaft 609 being interior to shaft 602. The upper arm portion 6 has an upper housing end 603, a housing surface 604, and a housing surface 605 disposed generally adjacent to surface 604. A housing surface 607 is disposed between surfaces 603 and 605 in FIG. 9.

Also in FIG. 9, a clam shell portion 705 is shown which attaches the eblow 7 to the upper arm portion 6. A cover member 738 covers the interior gear assemblies discussed hereunder. A clam shell portion 720 is also shown in FIG. 9, which is integral with portion 705. A lower housing portion 713 is disposed to the right of the clam shell member 720, beyond which are visible a bevel gear 714, a locator pin 715, another bevel gear 716, and a bevel gear 726.

Figure 10:
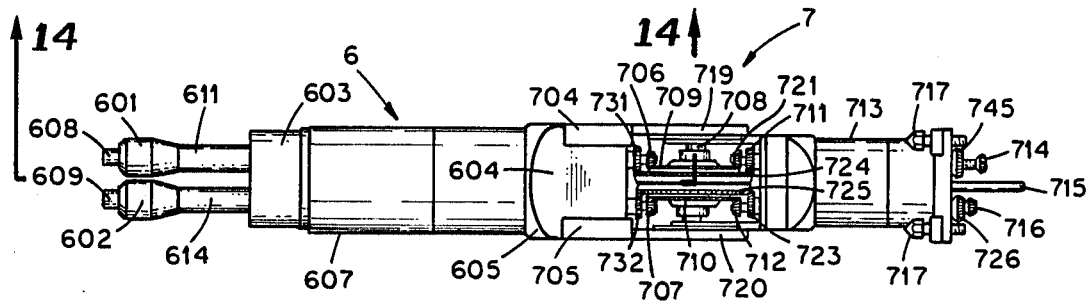
FIG. 10 is a top elevational view of the apparatus of FIG. 9.

FIG. 10 is a top elevational view of the elbow module 7 shown in FIG. 9. Here, the gear transmission assembly is visible at the elbow joint between claim shell portions 719 and 720, and 704 and 705. Also visible is a corresponding outer drive shaft 611 having a splined end 601 and an interior drive shaft having a splined end 608. The output gear of the interior drive shaft 608 is shown as bevel gear 706, and the output gear 731, which is a bevel gear, is connected to the shaft 611. The bevel gear 706 is in driving contact with an outer bevel gear 709. The bevel gear 731 is in contact with an inner bevel gear 724. This inner bevel gear is connected to a bevel gear 750 in driving relationship thereto. The outer bevel gear 709 is in driving relation to a bevel gear 711 connected to a shaft which runs interiorly of the bevel gear 724. The inner and outer bevel gears 709 and 725, and the symmetrically disposed inner and outer bevel gears 710 and 725, are all supported on a main gear shaft 708. This shaft is preferably supported by bearings, however, as discussed in the above, any other friction-reducing support may be used. The bevel gear 725 is driven by bevel gear 732, while the outer bevel gear 710 is driven by bevel gear 707. the bevel gears 707 and 732 are driven, respectively, by the shafts 609 and 602.

The outer bevel gear 710 drives bevel gear 712 and the inner bevel gear 725 drives the bevel gear 723.

Bolts 717 are used to connect the module 7 to the wrist module 8 (not shown in FIGS. 9 and 10). As seen in FIG. 10, bevel gear 723 drives the output gear 726, and the inner bevel gear 712 drives the output bevel gear 716. Also, the inner bevel gear 711 drives the output bevel gear 714, while the outer bevel gear 724 drives the output bevel gear 745. The locator pin 715 is also visible in FIG. 10.

Figure 11:
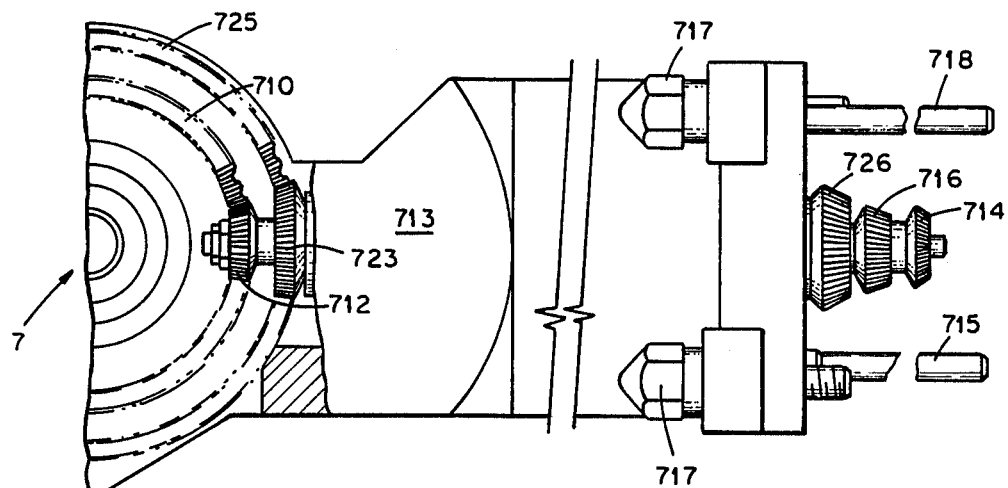
FIG. 11 is a side view partially in section taken along line 11—11 of FIG. 10.

FIG. 11 is a side view partially in section taken along line 11—11 of FIG. 10. This FIG. shows the outer bevel gear 710, showing it as having a smaller radius than the inner bevel gear 725, the term "inner" referring to the attachment of the gear along the shaft 708. The bevel gear 712 and bevel gear 723 are both shown in contact with the bevel gears 710 and 725 respectively. Shaft connected to the gear 712 passes centrally through a bore in the gear 723. The body 713 is shown, having bolts 717 and having locator pins 715 and 718 shown. Although the output gears 726, 716, and 714 appear to be upon a single shaft in FIG. 11, such is not the case as seen in FIG. 12.

Figure 12:
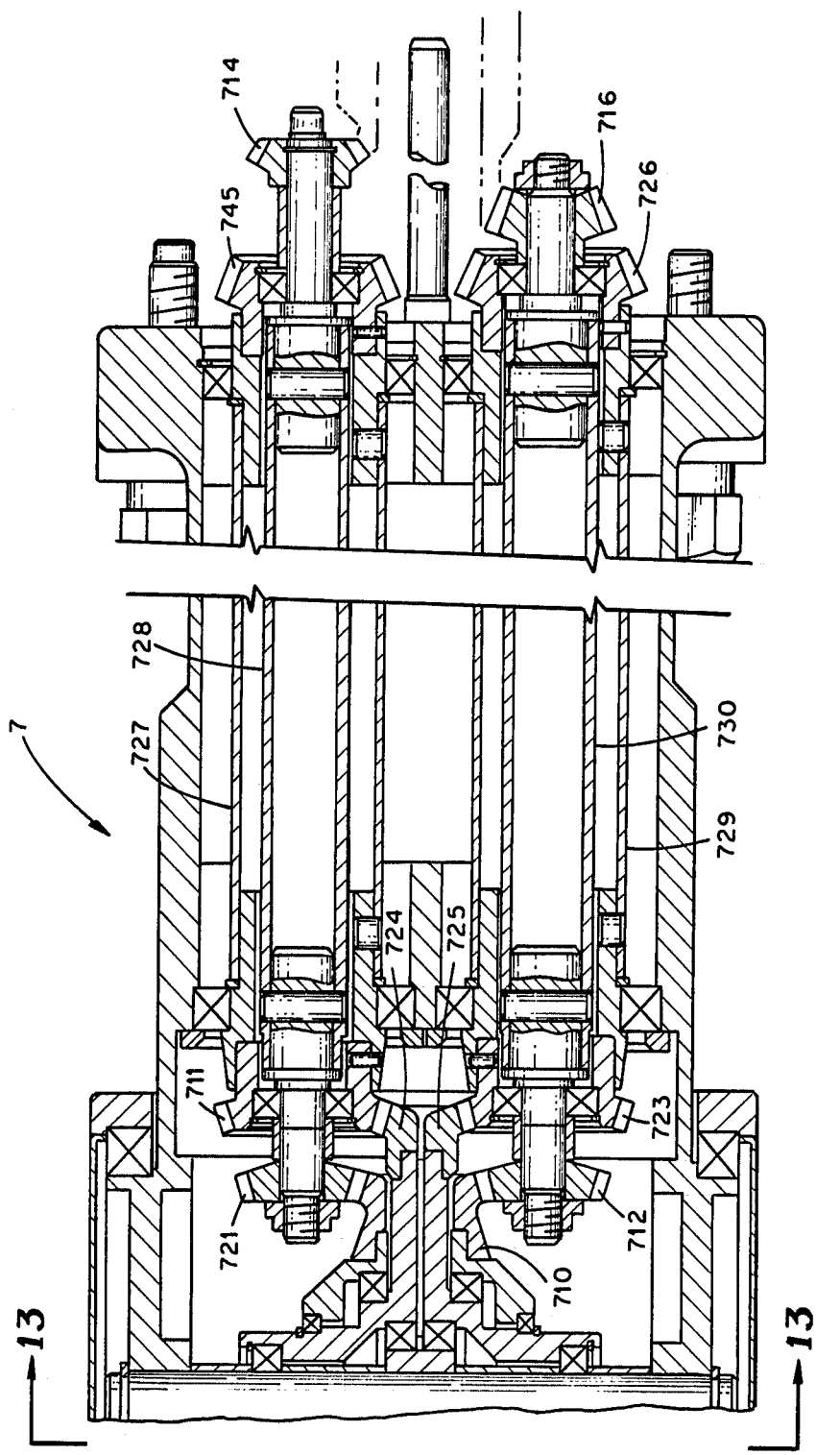
FIG. 12 is a sectional view taken along line 12—12 of FIG. 9.

FIG. 12 is a sectional view taken along line 12—12 of FIG. 9. This shows an outer output bevel gear 745 an inner bevel gear 714 which extends beyond the gear 745. Gear 714 extends beyond the corresponding output gear 716, which has an outer gear 726 as shown in FIG. 12.

An inner shaft 728 connects the gears 721 and 714. An outer shaft 727 connects the gears 711 and 745.

Correspondingly, an outer shaft 729 connects gears 723 and 726, while an inner shaft 730 connects gears 712 and 716. Bearing supports are shown throughout for supporting the rotating parts, but as discussed above any type of friction-reducing support could also be used which permits rotary motion and adequate precision.

Figure 13:
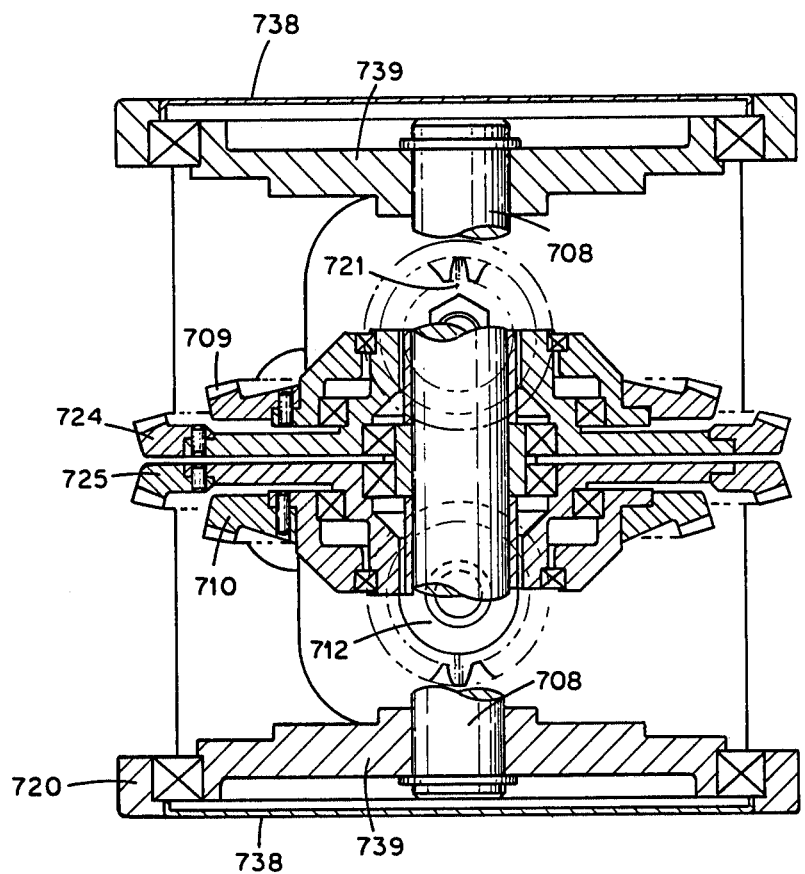
FIG. 13 is a sectional view taken along line 13—13 of FIG. 12.

FIG. 13 is a sectional view taken along line 13—13 of FIG. 12. This shows the bevel gear arrangement clearly, that is, it shows the inner and outer bevel gear arrangement on the shaft 708. Housing members 739 are disposed at opposite ends of the shaft, as are the cover members 738. bevel gear 712 is shown, as is bevel gear 721 in phantom. As seen, the bevel gears are arranged on shaft 708 in the following order: outer bevel gear 709, inner bevel gear 724, corresponding inner bevel gear 725, and corresponding outer bevel gear 710. These gears are able to rotate independently of one another due to the bearings (unnumbered) which are disposed between adjacent surfaces of the inner and outer bevel gears. Each of these gears also may rotate independently upon the shaft 708 due to individual bearings attached to each of the gears. These bearings permit rotational but not translational movement of the gears.

Figure 14:
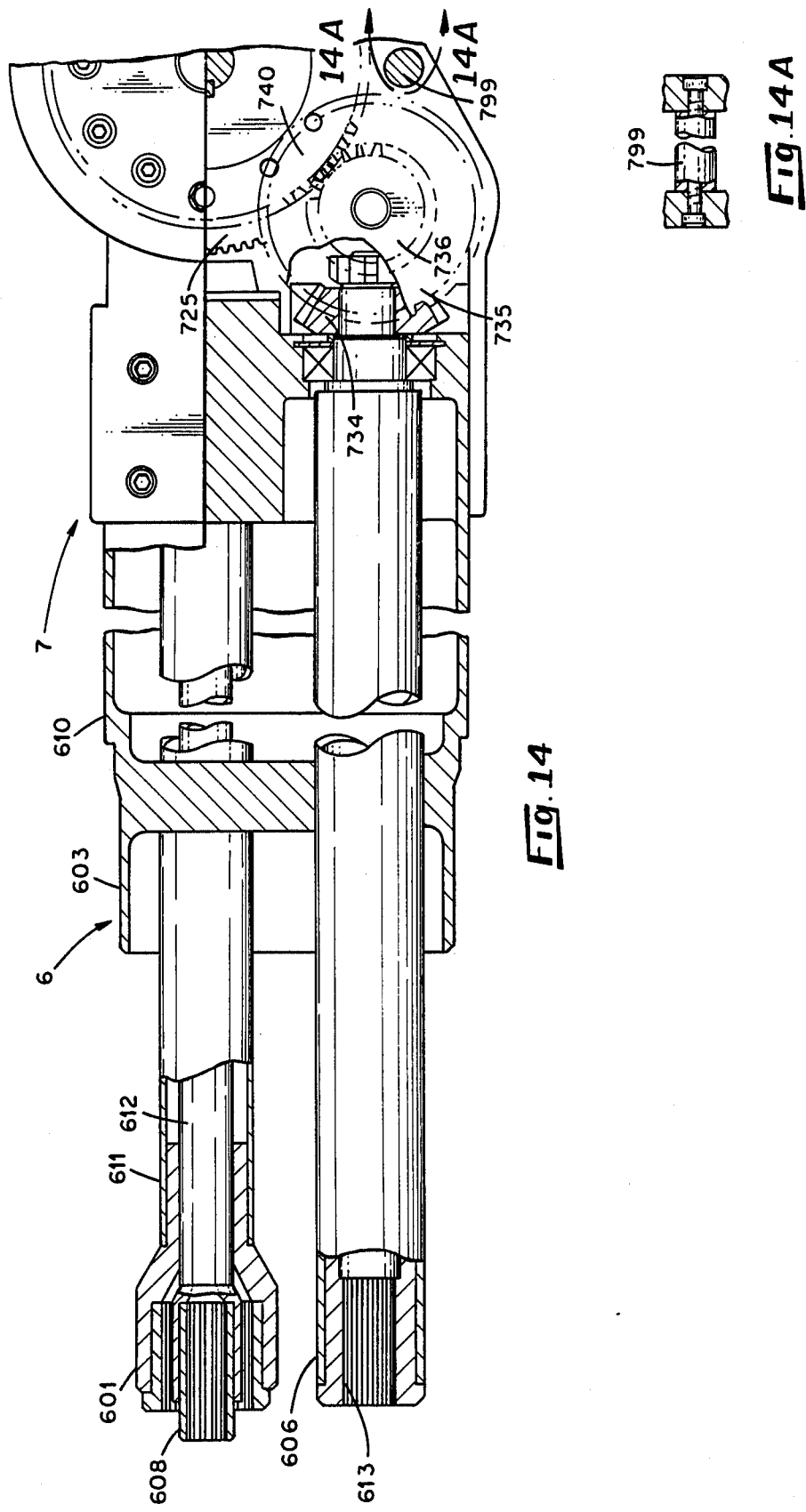
FIG. 14 is a side view, partially broken away, as viewed along line 14—14 of FIG. 10.

FIG. 14 is a side view, partially broken away of the elbow module 7 taken along line 14—14 of FIG. 10. This clearly shows an inner shaft 612 connected to splined end 608 and an outer shaft 611 connected to end 601 for driving bevel gears at the elbow joint portion. An upper housing portion 610 is seen in FIG. 14, as are gears 736 and 735, gear 736 driving the elbow pitch gear 740. Shaft 606 shown in FIG. 14 having splined end 613 integral therewith, drives the bevel gear 734, which in turn drives the bevel gear portion 735 of a spool-like member having two gears 736, one at each end. Therefore, rotational motive force applied about the shaft 613 causes elbow pitch to occur along gear 740.

FIG. 14A is a side sectional view taken along line 14A—14A of FIG. 14. This view is partially broken away along its middle and is intended to show a separating member 799 which maintains separation of the clam shell halves 719, 720 generally.

Figure 15:
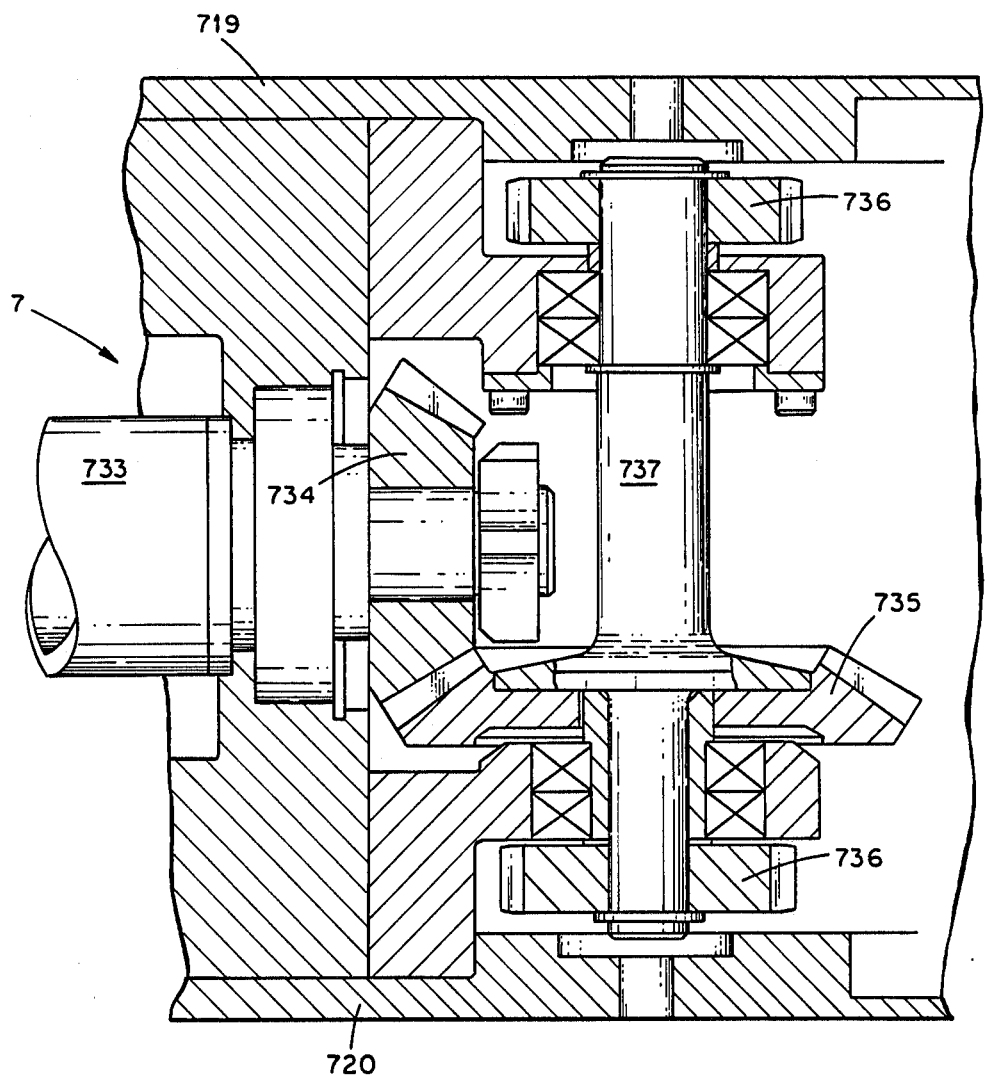
FIG. 15 is a sectional view taken along line 15—15 of FIG. 9.

FIG. 15 is a sectional view taken along line 15—15 of FIG. 9. This shows more clearly the shaft 33 which is connected to shaft 606 which drives gear 734. Gear 734 drives the bevel gear 735, which is supported by a double pair of bearings. At either end of a shaft 737, connected to the gear 735, are a pair of gears 736, 736. These gears act upon elbow roll gears 740, 740 (only one of which is shown in FIG. 14) to cause elbow pitch to occur. The clam shell members 719, and 720 are seen in this figure.

Figure 16:
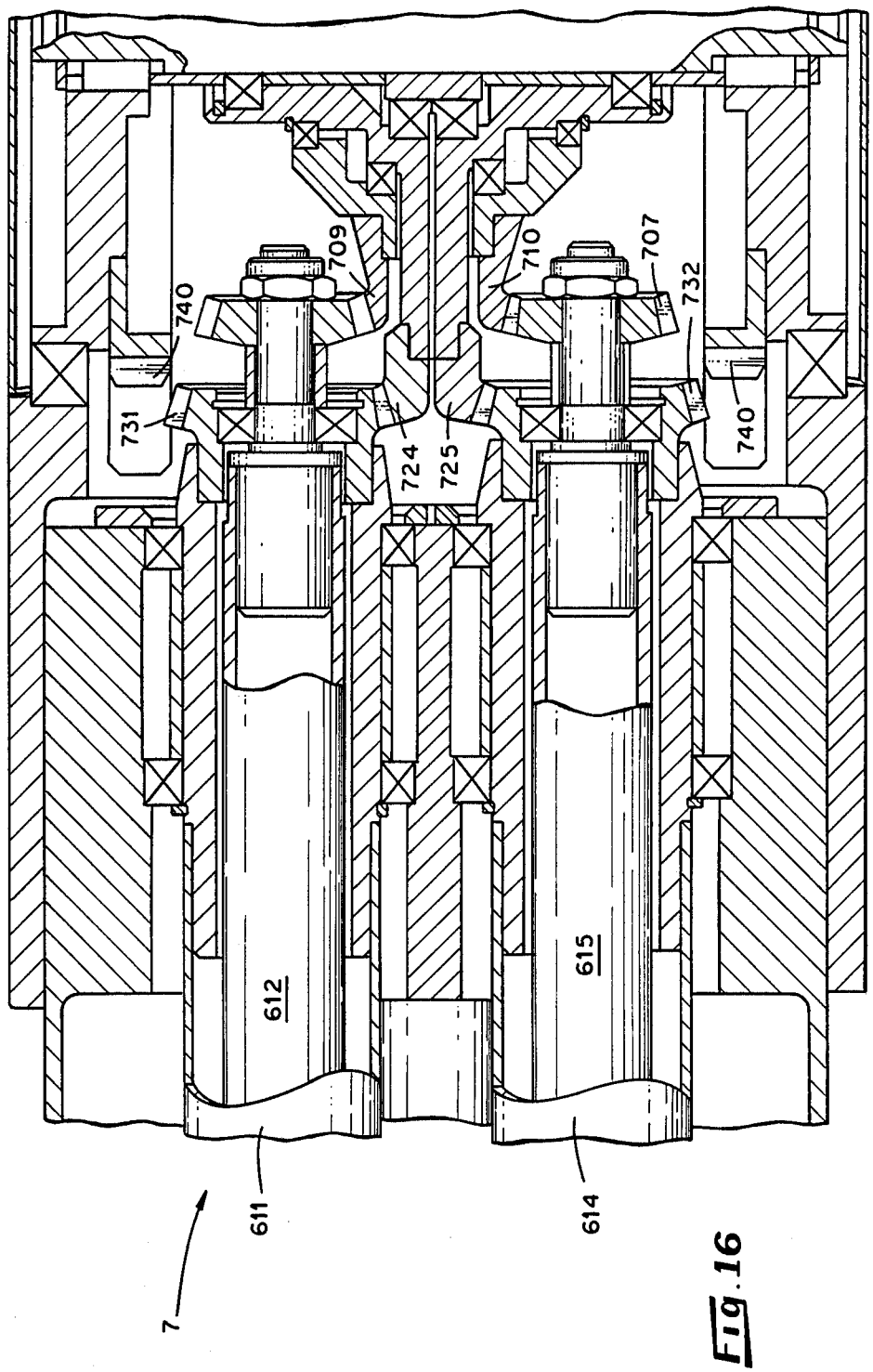
FIG. 16 is a sectional view taken along line 16—16 of FIG. 9.

FIG. 16 is a side view, partially in section, of the elbow module as taken along line 16—16 of FIG. 9. This shows outer shaft 611 driving gear 731, and inner shaft 612 driving gear 706. The bevel gears 709, 727, 728 and 710 are also shown in side sectional view. Bearings are employed between relatively rotating parts, to allow independent rotation thereof. Such bearings are, as usual, unnumbered.

Outer shaft 614 is shown driving gear 732, while inner shaft 615 drives gear 707. A portion of a tooth of the elbow pitch gears 740 is seen in FIG. 16 along the upper portion slightly to the right of the center of the drawing.

Figure 17:
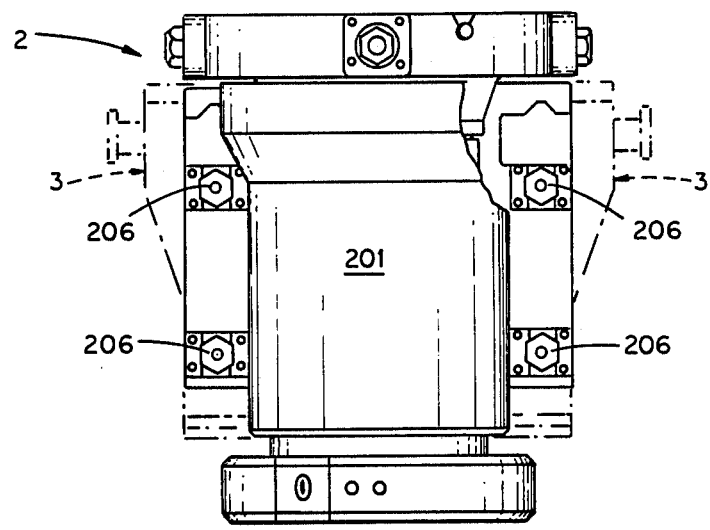
FIG. 17 is a side elevational view of a roll sleeve module 2 of the present invention.

FIG. 17 is a side elevational view of the roll sleeve module 2 of the present invention. An outer cylinder wall 201 is seen in the drawing, with retaining bolts 206 shown in the figure for attachment of the module 2 to the shoulder module assembly 3 for movement therewith during shoulder pitch operations.

Figure 18:
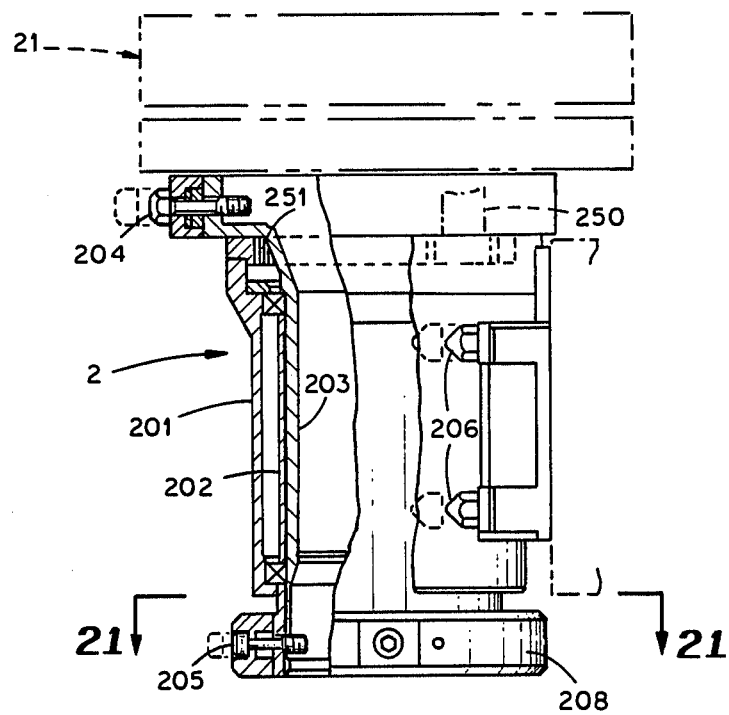
FIG. 18 is front view partially broken away showing a portion of a sectional view of the device of FIG. 17, as taken from the right side of FIG. 17.

FIG. 18 is a front view of the left arm, partly broken away in section, of the roll sleeve module of FIG. 17 as seen from the right side of the figure. Here, the connection of the module 2 to the module 3 is more clearly seen, as well as the connection of the gear pod module 21 to the module 2, the gear pod module 21 lying on top of and fixedly connected to module 2 by connecting member 204.

Pinion 250 is visible in partial dotted outline in FIG. 18, and operates to drive the internal gear 251 mounted to the outer cylindrical wall 201 which is stationary and which is fixedly connected to module 3. This permits relative rotation of the inner cylindrical member 203 which itself is fixedly connected with gear pod module 21. Thus, gear pod module 21 rotates about the longitudinal axis 18 due to actuation of pinion 250 relative to gear teeth integral with the fixed wall 201, thus causing relative movement between the concentric cylindrical walls 203 and 201. A fastener 205 is shown in FIG. 18. Also, a bearing spacer 202 is mounted for rotation with cylindrical wall 203. Bearings are used to provide reduced-friction rotational mountings, the bearings permitting rotational motion but not translational movement. The fasteners 206 are seen more clearly in FIG. 18 and show the manner of attachment of module 2 to module 3.

FIG. 19 is a top elevational view of the module 2 of FIG. 17. Pinion 250 is shown in partial outline in this figure. Also, shown in partial outline are the drive shafts 606, 611, and 614. Although these drive shafts are not part of module 2, they pass through the hollow center of module 2 for direct connection to gear pod module 21. Bolts 204 are seen also in this figure.

FIG. 20 is a side view taken at an angle to FIG. 19 to show the locating slot 207 which mates with a locating pin on module 21 to correctly align that module with module 2.

FIG. 21 is a sectional view taken along line 21—21 of FIG. 18 and shows the connecting ring 208, which is used to connect the lower end of module 2 to a portion of the upper arm portion 6 of the elbow module 7.

Figure 22:
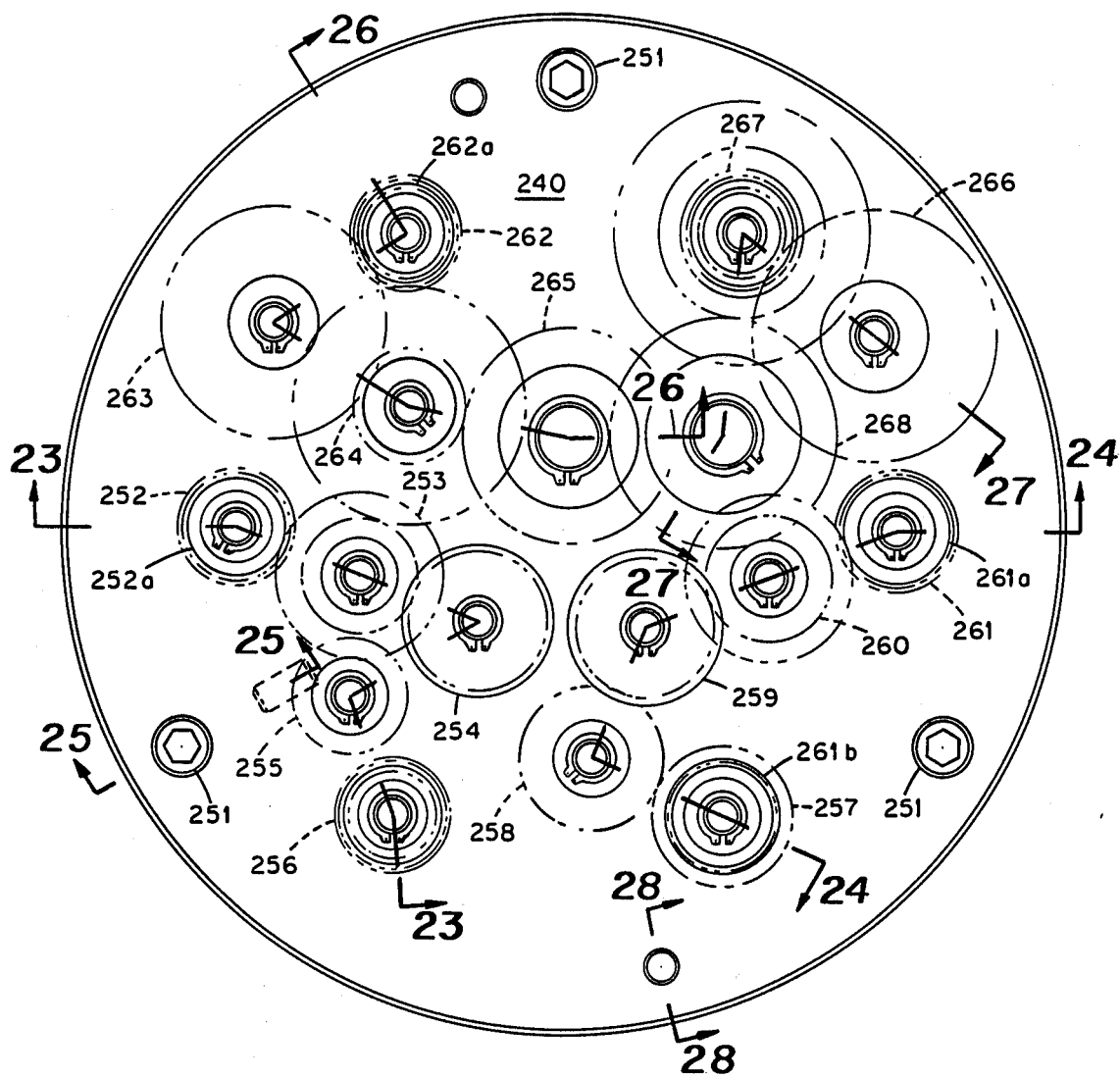
FIG. 22 is a top elevational view of a gear pod module 21 of the present invention.

FIG. 22 is a plan view of the top of the gear pod module 21. The top of the upper housing portion 240 is visible as a flat surface in FIG. 22. Bolts 251 are visible also in FIG. 22. Gear trains are shown in top view in FIG. 22 as follows. Gears 252, 253, 253a, 253b, 254, 255, and 256 are used to provide wrist roll and pitch/yaw movements, the gears 252 and 256 having toothed top gear portions 252a and 256a which are adapted to be rotated by a motor module 10 (not shown in the FIGS. 22-28). In particular, the gear 252 provides motive rotary power for the wrist pitch/yaw movement. The gear 256 provides rotary motive power for the wrist roll movement.

The gear path shown as section 24—24 provides wrist tong and pitch/yaw movement. This includes gear 257-261, with gear 257 providing wrist tong motive rotary power, and gear 261 providing wrist pitch/yaw movement.

The gear path show as path 26—26 in FIG. 22 includes gears 262, 263, 263a, 264, 264a, and 265. The gear 262 is adapted to receive rotary motive power from motor module 10 through toothed top gear portion 262a to provide rotary motive power to an elbow pitch drive spline 274 (shown in FIG. 26).

In FIG. 22, the gear path labeled 27—27 provides shoulder roll motion, and supplies rotary motive power to the pinion gear 250. The gear 267 in the path is adapted to receive rotary motive power from a module 10. The gears in the gear train include gears 266, 267, and 268.

Figure 23:
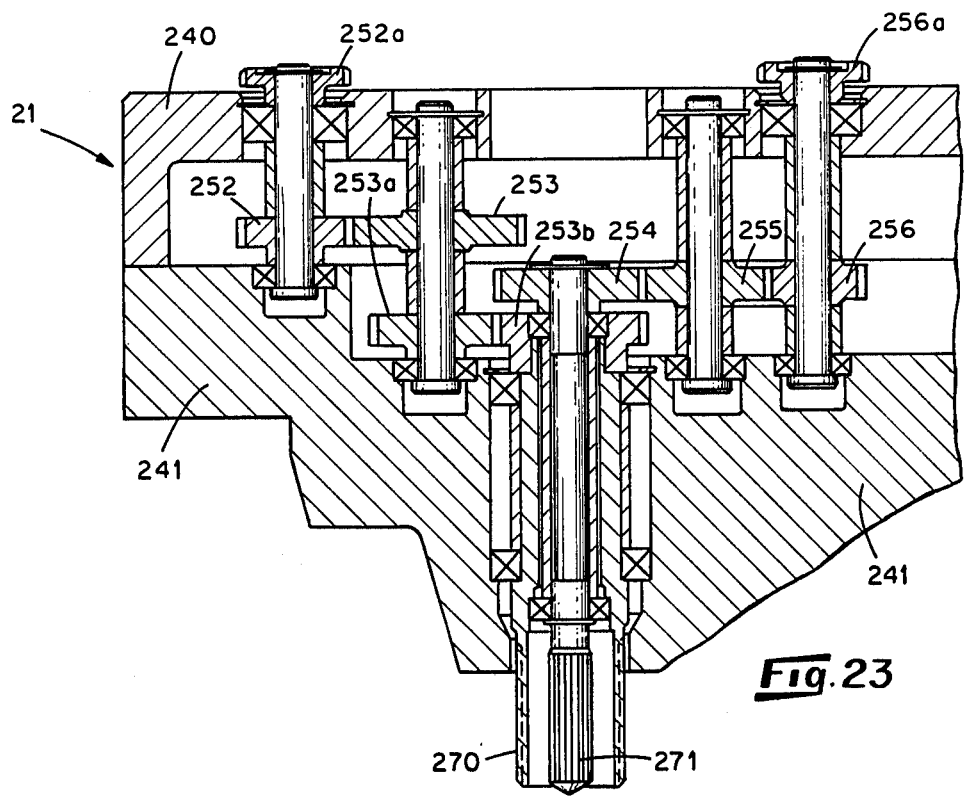
FIG. 23 is a sectional view taken along line 23—23 of FIG. 22.

FIG. 23 is a sectional view taken along line 23—23 of FIG. 22. Here, the gear train path shows how rotary motive power is transmitted from the rotary input gear 252, which has a spool-like shape (as do all of the other gears referred to above) and meshes with the gear 253. Gear 253 has a lower gear portion which meshes with another gear (also unnumbered) which drives the outer drive shaft member 270, which ultimately controls wrist pitch/yaw movement. The other input gear 256 drives gear 255 which in turn drives gear 254. Gear 254 drives the inner drive shaft 271 which controls wrist roll movement. In FIG. 23, the upper housing portion 240 is shown connected to the lower housing portion 241.

Figure 24:
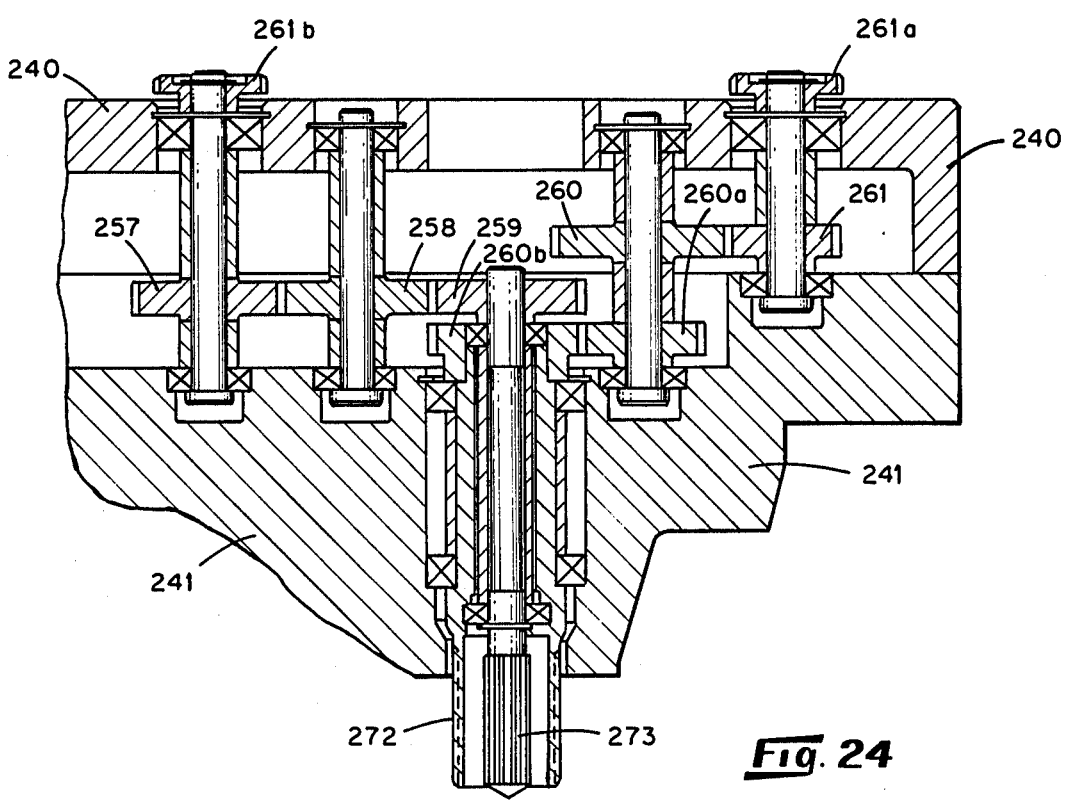
FIG. 24 is a sectional view taken along line 24—24 of FIG. 22.

FIG. 24 is a sectional view taken along line 24—24 of FIG. 22. The gear arrangement is very similar to that shown in FIG. 23, however input gear 257 transmits rotary power to gear 258 which in turn transmits power to gear 259. Gear 259 drives the inner drive shaft 273 which controls wrist tong movement. The input drive gear 261 drives gear 260 which has a lower gear member (unnumbered) which drives the outer drive shaft 272. Drive shaft 272 also controls wrist pitch/yaw movement.

Figure 25:
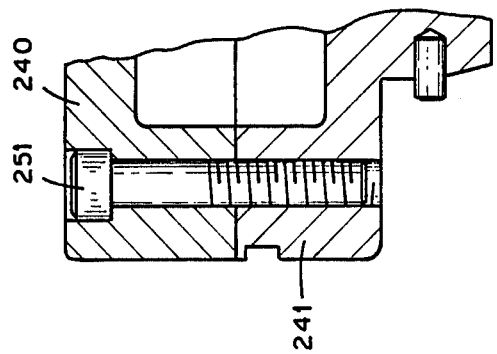
FIG. 25 is a sectional view taken along line 25—25 of FIG. 22.

FIG. 25 is a side sectional view taken along line 25—25 of FIG. 22. This shows the connecting bolt 251 which is used to connect housing halves 240 and 241 together. This is typical, and is used at 3 locations as shown in FIG. 22.

Figure 26:
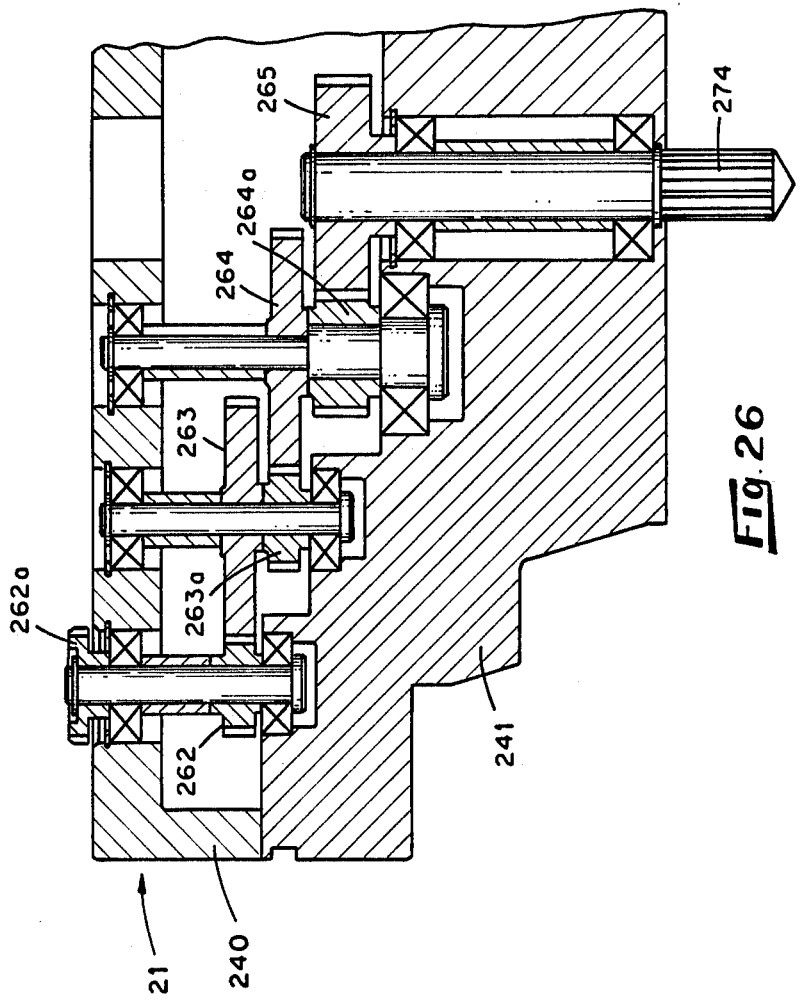
FIG. 26 is a sectional view taken along line 26—26 of FIG. 22.

FIG. 26 is a sectional view taken along line 26—26 of FIG. 22. The input gear 262 drives gear 263, which provides gear reduction and in turn drives gear 264, which also provides a gear reduction so as to drive gear 265. Gear 265 drives the shaft 274 which controls elbow pitch.

Figure 27:
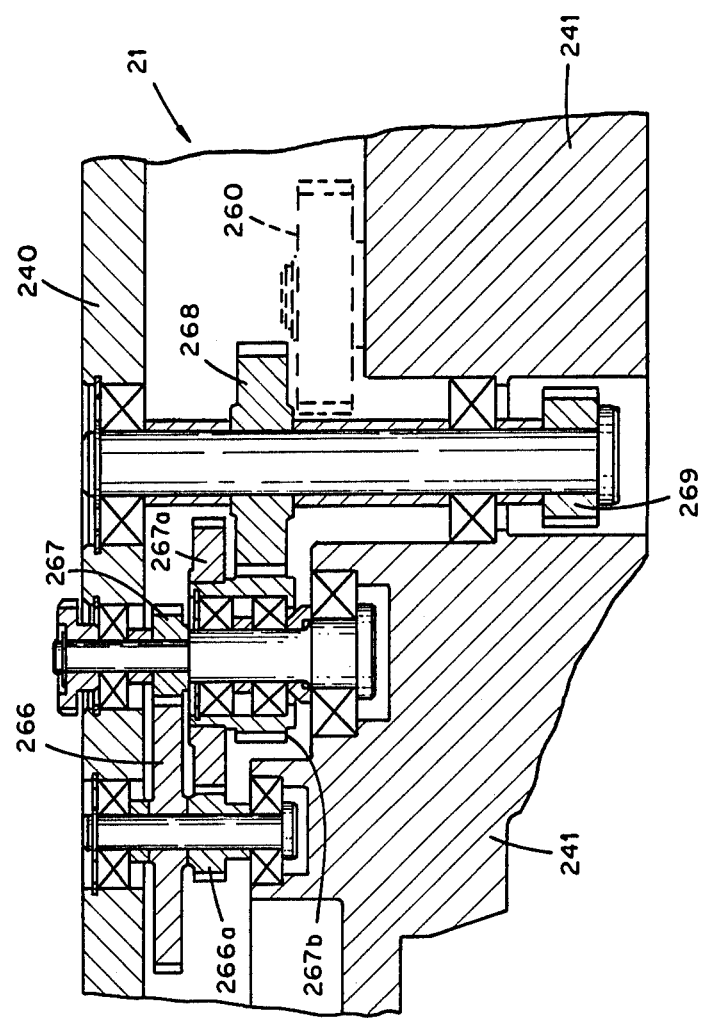
FIG. 27 is a sectional view taken along line 27—27 of FIG. 22.
Figure 28:
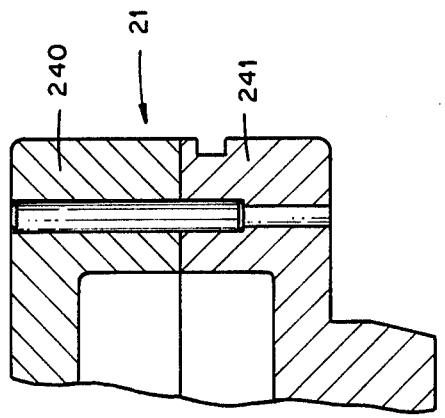
FIG. 28 is a sectional view taken along line 28—28 of FIG. 22.

FIG. 27 shows a side sectional view taken along line 27—27 of FIG. 22. Input gear 267 rotates gears 266 and 268 simultaneously. The gear 268 is also spool-like, and the lower end 269 provides rotary motive power to control shoulder roll. FIG. 28 is a sectional view taken along line 28—28 of FIG. 22. This shows a counterbored hole for insertion of an alignment pin between upper and lower housing halves 240 and 241. This is typical of the two places where this is used. FIGS. 29, 30, 31 and 32 show a counterbalance assembly used in one alternative embodiment of the present invention. As seen in FIG. 29, a counterweight 223 is supported by an arm 221 which is moved by parallel arms 220 and 224 during movement of the upper arm section 6 relative to the elbow module and lower arm portion 7.

Figure 30:
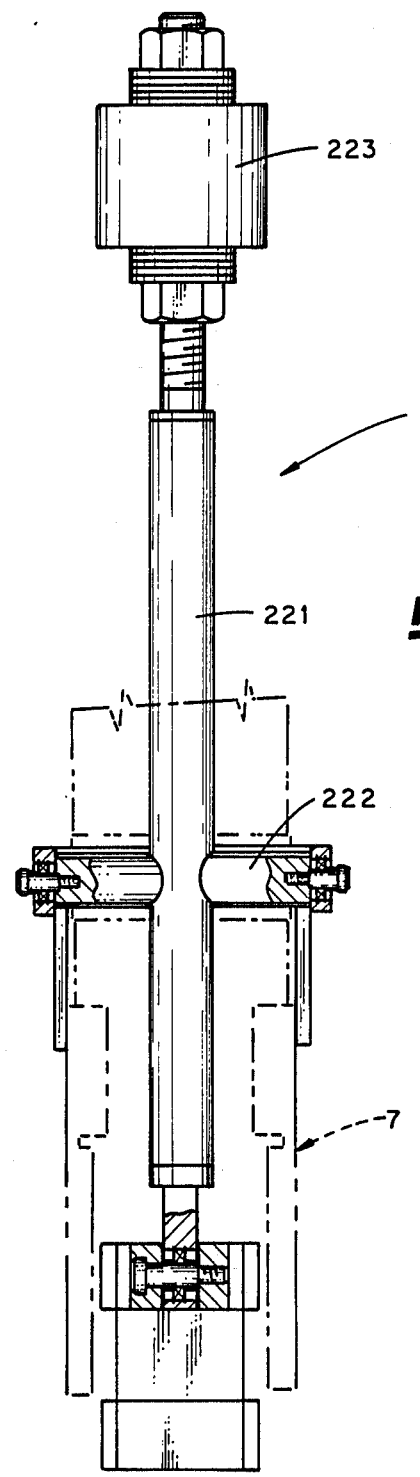
FIG. 30 is a front elevational view of the counterbalance assembly of FIG. 29.

In FIG. 30, the connecting link 222 is seen clearly.

Figure 31:
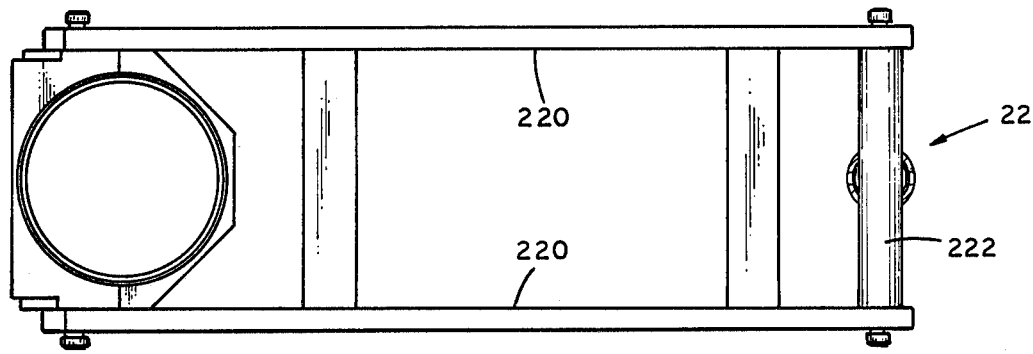
FIG. 31 is a sectional view taken along line 31—31 of FIG. 29.

In FIG. 31, which is a top sectional view taken along line 31—31 of FIG. 29, the linkage members 220, 220 are seen clearly, along with the connecting member 222.

Figure 32:
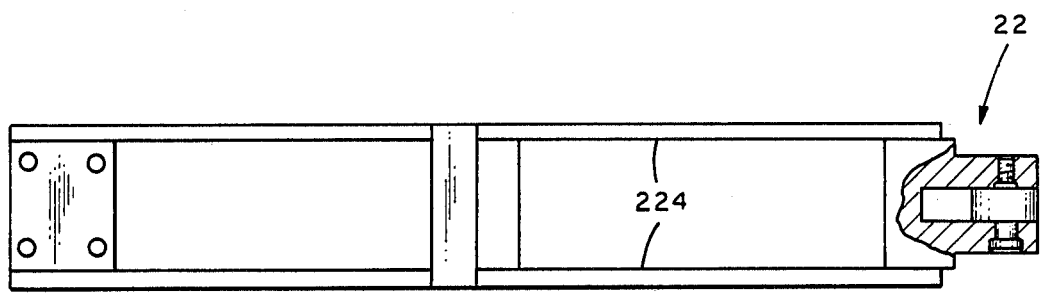
FIG. 32 is a sectional view taken along line 32—32 of FIG. 29.

FIG. 32 is a sectional view taken along line B—B of FIG. 29. This shows the construction of the pair of linkage members of 224, 224 used in the linkage.

FIG. 33 is a top elevational view of the motor module 10 mounted atop the gear pod module 21. In particular, in dotted outline are shown components of the motor module 10. In particular, an electrical socket 114 is seen in the module 10.

FIG. 34 is a view taken along line 34—34 of FIG. 33. This shows in dotted outline other components of the module 10. In particular, a shaft 111 is shown, together with an Inertial Motors Corporation motor 108. A potentiometer 105 and a locking/latching assembly 106 is also shown. A cover 109 is fixedly attached to the member 10. A fastener housing portion 107 is also shown in this figure.

Figure 35:
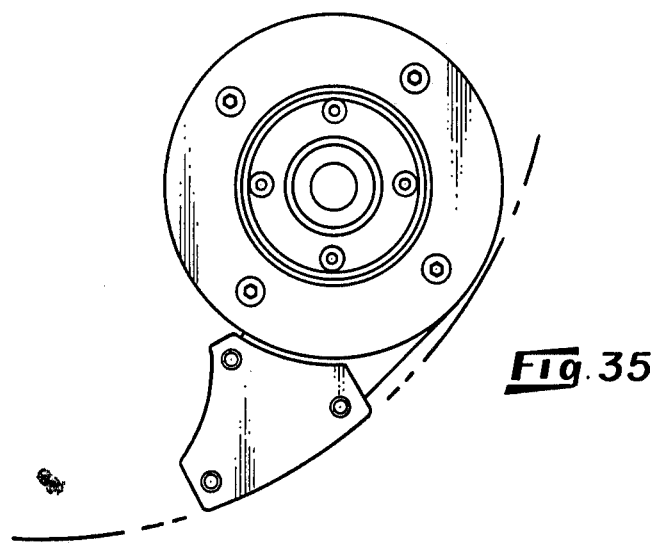
FIG. 35 is an end view from the right hand side of FIG. 34 of the drive motor module shown therein.

FIG. 35 is an end view taken from the right of FIG. 34.

Figure 36:
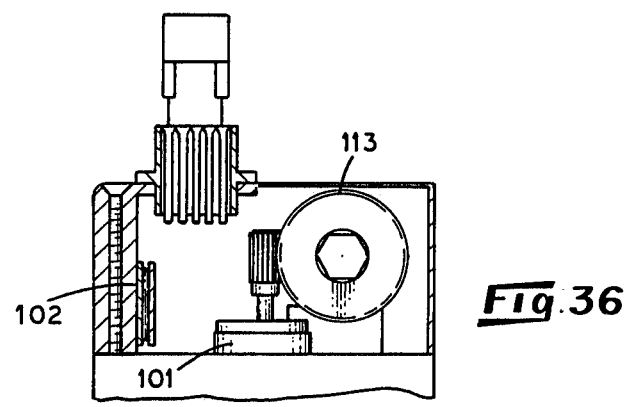
FIG. 36 is a sectional view taken along line 36—36 of FIG. 33.

FIG. 36 is a sectional view taken along line 36—36 (and rotated 90°) of FIG. 33. Here is shown generally schematically a tachometer 101, a circuit board and wiring 102, and an anti-backlash gear 113.

Figure 37:
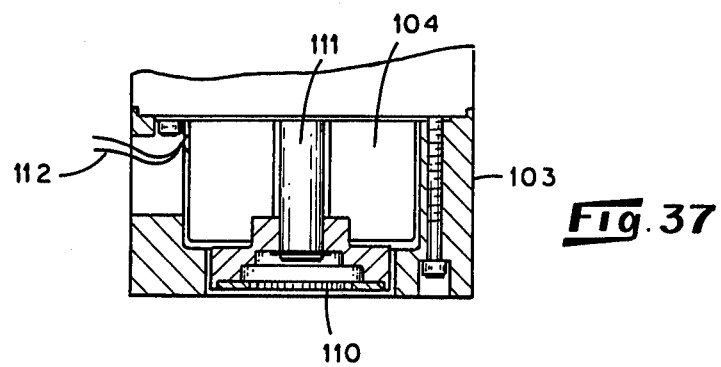
FIG. 37 is a sectional view taken along line 37—37 of FIG. 33.

FIG. 37 is a sectional view taken along line 37—37 (rotated 90°) of FIG. 33. Here is shown a brakehousing 103, a brake 104, shaft 111 and a gear coupling 110. Wiring 112 is also visible, which supplies power to the brakes.

Figure 38:
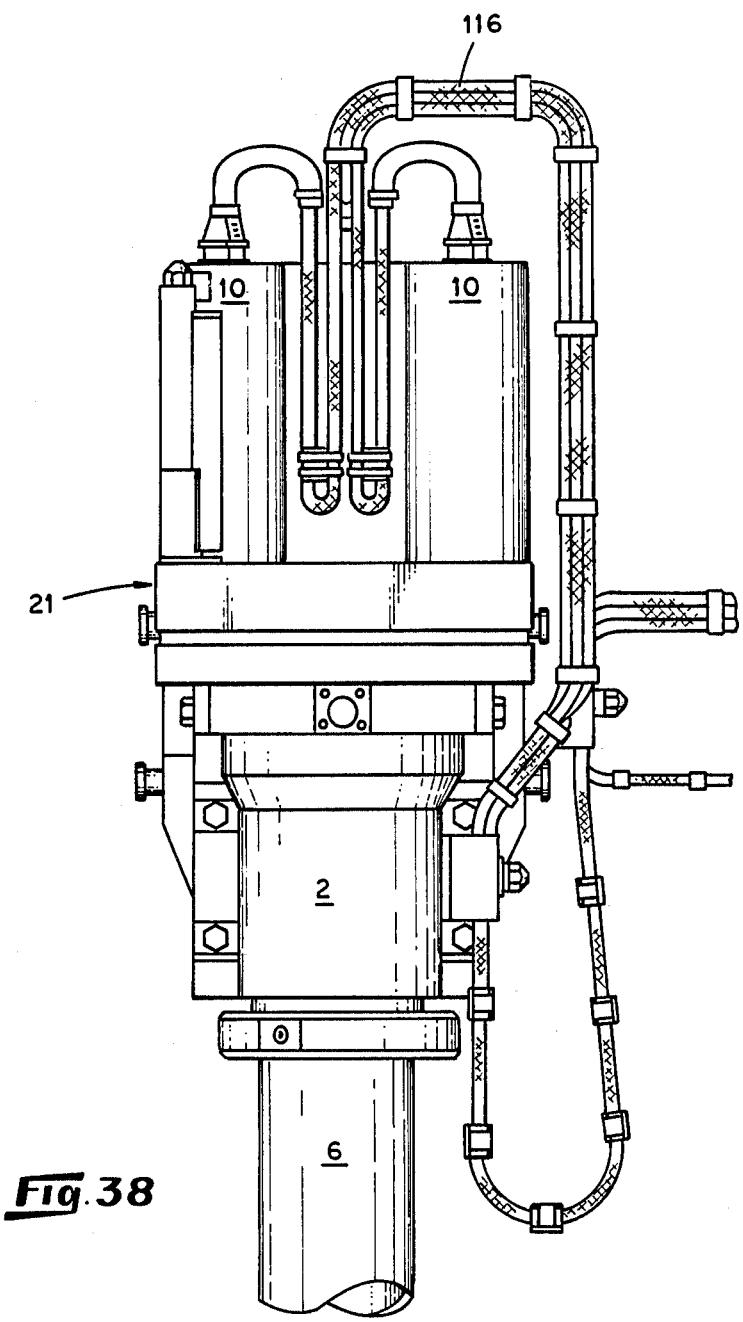
FIG. 38 is a side elevational view a cable harness assembly used to supply electric power and sensory connection in the present invention.

FIG. 38 is a side elevational view of a cable harness assembly used to supply electrical power to the motor modules 10. As seen in FIG. 38, a pod electrical power supply bundle 116 supplied power from an external source to each of the motor modules 10 on the pod 21. The pod 21 is seen mounted upon sleeve 2 which in turn is connected to upper arm portion 6.

Figure 39:
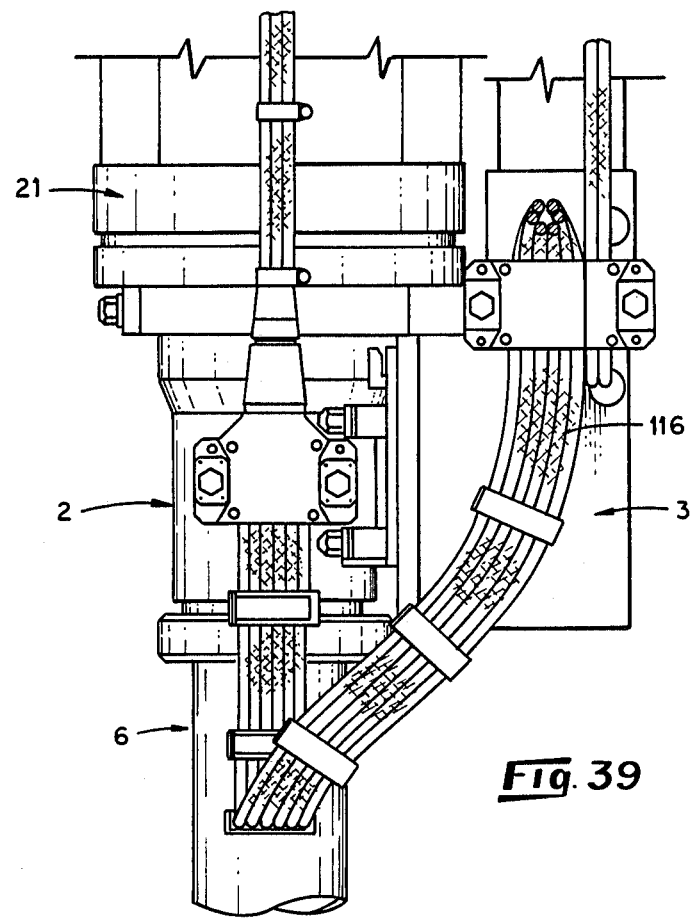
FIG. 39 is a back view taken from the left arm of FIG. 38.

FIG. 39 is a side view taken from the right of FIG. 38, also showing the harness 116 and additionally showing the shoulder module assembly 3 connected to the sleeve 2.

Figure 40:
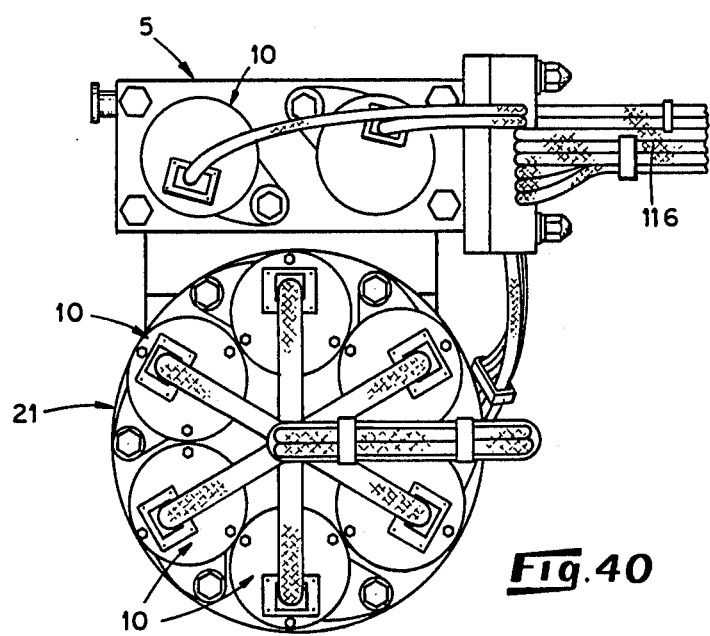
FIG. 40 is a top elevational view of the device of FIG. 38.

FIG. 40 is a top view in elevation of the device shown in FIG. 38. Here, a shoulder pitch electrical power supply bundle 116 supplies power to the shoulder motor modules 10. FIG. 40 also shows the connection of the pod 21 to the shoulder drive pod assembly 5.

Figure 41:
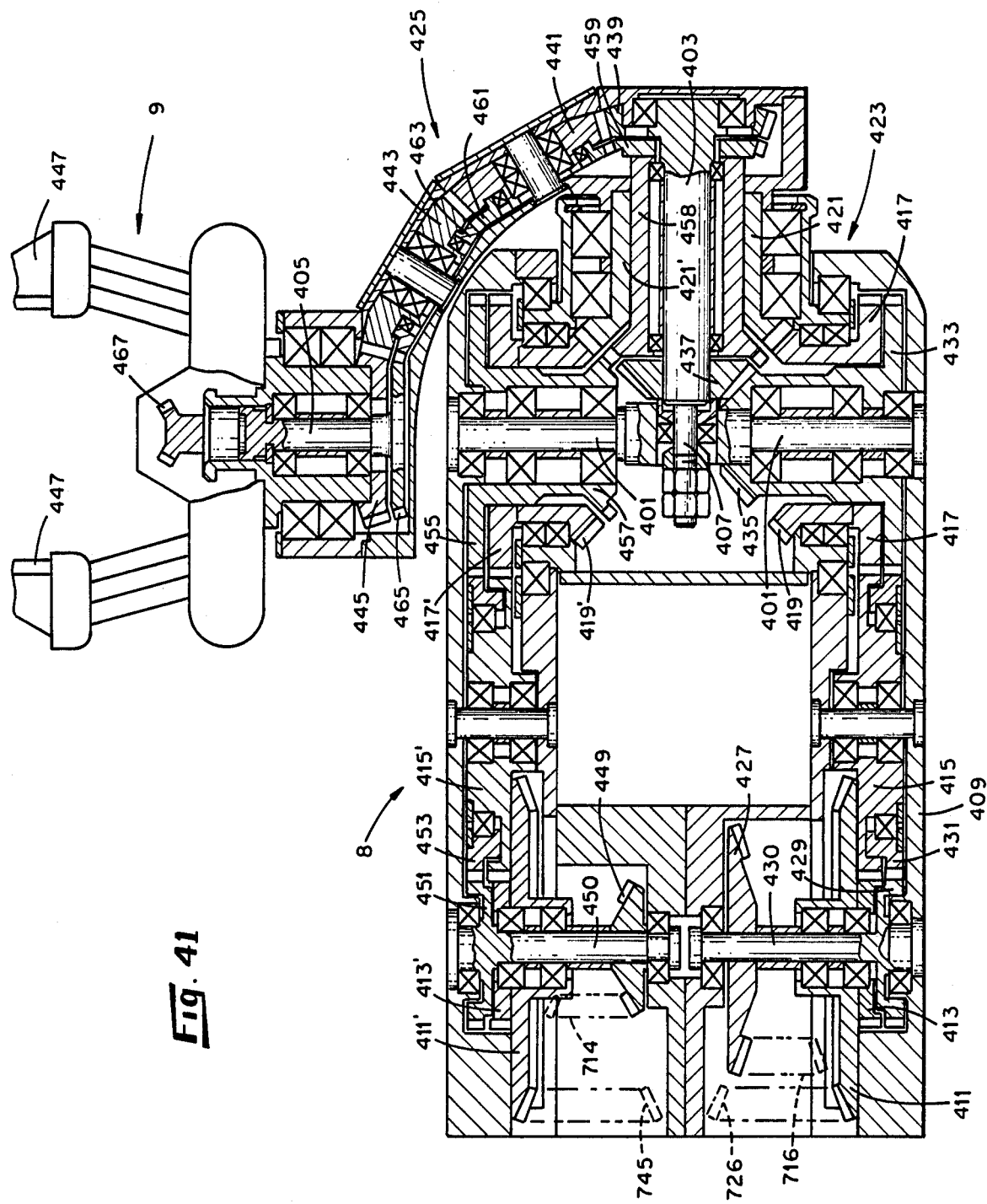
FIG. 41 is a detail sectional view of the wrist module 8 and tongs 9.

The wrist mechanism of FIG. 41 is an intersecting axis mechanism capable of pitch, yaw and roll motions and a full degree of freedom tong motion (open and close-no spring return) as illustrated in FIG. 1. The pitch, yaw and roll motions correspond to rotation of wrist components about shafts 401, 403, and 405, respectively. The axis of these three shafts intersect at a common point 407. Gear trains described in detail below drive the wrist through its pitch, yaw and roll motions and open and close tong 9.

Mounted within external wrist support 409 are two identical gear trains which control the pitch and yaw motions of the wrist. The first gear train consists of a bevel gear 411 which is attached to spur gear 413. Spur gear 413 drives spur gear 415 which drives spur gear 417. Miter gear 419, which is attached to and driven by gear 417, engages and drives miter gear 421. A second identical gear train composed of corresponding gears 411', 413', 415', 417', 419', and 421' operates in parallel but independently of the first gear train. The first and second gear trains are driven by bevel gears 745 and 726 shown in phantom in FIG. 41. Bevel gears 745 and 726 are part of the elbow module to which wrist 8 is attached as illustrated in FIG. 12.

Pitching motion, or rotation of the entire end portion 423 of the wrist module about shaft 401 occurs when first gear train 411, 413, 415, 417, 419, and 421 is driven in the same direction and at the same rate as second gear train 411', 413', 415', 417', 419', and 421' by bevel gears 726 and 745, respectively. Yawing motion or rotation of tong support arm 425 about shaft 403 occurs when the respective first and second gear trains are driven in opposite directions. The direction of the yawing motion is reversed by reversing the directions in which the respective first and second gear trains are moving.

Rolling motion or rotation of tong 9 about shaft 405 is driven by a gear train consisting of bevel gear 427 keyed to shaft 430, spur gear 429 which is integral with and driven by spur gears 431 and 433, miter gear 435 attached to spur gear 433, miter gear 437 whichis keyed to shaft 403, bevel gear 439 which is integral with shaft 403, bevel gears 441 and 443 and special gear 445. The gear train providing rolling motion is driven by bevel gear 716 shown in phantom in FIG. 41. Bevel gear 716 is part of the elbow module.

Actuation of tong 9 to open or close fingers 447 is accomplished by means of a tong actuation gear train consisting of bevel gear 449 keyed to shaft 450 which is integral with spur gear 451, spur gear 453, spur 455 attached to bevel 457 drives bevel gear 458, bevel gear 459, bevel gear 461, bevel gear 463 and special gear 465 which is integral with tong drive shaft 405 driving bevel pinion gear 467. Pinion gear 467 drives a tong module 9 consisting of a Sargeant Industries, Central Research Lab System 50 type tong modified to be remotely replaceable from the wrist module with a changeout tool. Alternatively, the wrist module can be used to drive special tooling without the tong module. Drive power to the tong actuation gear train is provided by means of bevel gear 714 shown in phantom in FIG. 41. Bevel gear 714 is part of the shoulder module as illustrated in FIG. 12.

In operation, the advanced servo manipulator (hereinafter abbreviated as ASM) will be exposed to 3 potentially deteriorating conditions; high radiation; nitricacid fumes; and airborn particulate. Therefore, for this type of use, high quality materials which are corosion resistent are preferrably used, for example the bearings are preferred to be 440C stainless steel. All gears and shafts are generally of corrosion resistent 17-4PH stainless steel, and the housings are passivated 6061-T6 aluminum. Any other materials may be used, however, depending upon the particular application and intended use of the ASM. Generally two types of gears are used on the ASM. These are spur and straight bevel, and conform to American Gear Manufacturers Association standards and are either 16 or 12 diametral pitch. Stresses are generally limited to 200 ksi hertz contact and 50 ksi bending. This gives a safety factor approximately 3 based on yield.

Since airborn particulate is of great concern, since the components are made so as to be capable of being decontaminated in a freon bath submersion method. This method requires open paths for the fluid to reach all internal parts of the arm, which therefore leaves the same open paths for the airborn particulate to reach gears and bearings. Nonetheless, this appears to be a best alternative since the use of seals, although possible, increase friction and therefore would reduce sensitivity of the ASM.

Minimizing motor friction is very important since this is the major component of total friction load and since it is multiplied by the gear ratio and the inverse of the efficiency of the gear train. The motors used in this application have a break away torque of approximately 6 ounces-inch in the present application, this produces the desired sensitivity of one pound. No lubrication will generally be required, however if such is necessary it would be either a light mineral oil or an impregnated dry film.

The present ASM is intended to be remotely operated by a human operator, with the forces involved being "reflected" electronically to another pair of arms (called "Master") which the human operator can feel or see. Here, electronic counterbalancing is used to offset the weight of the wrist and forearm so the operator won't have to lift that dead weight. It is contemplated that the inertial forces which are anticipated to be of approximately the same magnitude of the frictional forces. However, as shown in the figures, the other alternative is mechanical counterbalancing, and an example of such a mechanical counterbalancing system is shown. Such counterbalancing decreases friction, but increases inertia and the volumetric envelope of the manipulator.

The electrical cabling to the shoulder motors and gear pod motors was designed for convenient remote replacement, since the cable has a finite life due to radiation and brittlement in some applications. This permits ready replacement of the cable without dismantling of the ASM linkages and gears.

The force reflection threshold (sensitivity) is that force which must be applied to the ASM in order to get a position difference with the master (not shown), and therefore to get a reflected (perceived) force to the operator. This threshold has been shown to be a key feature for improving operator efficiency and dexterity.

In operation, the motor modules 10 supply rotary motive power to the appropriate gears. These gears provide either shoulder roll or shoulder pitch, or, when connected to the elbow module 7 elbow pitch. Furthermore, a pair of concentric shafts passes through the elbow joint and controls wrist pitch, wrist yaw, wrist roll, and tong movement. The mechanical connections enabling this are shown clearly in the figures referred to above.

The improved advanced servo manipulator of the present invention is capable of achieving the above-enumerated objects, and while preferred embodiments of the present invention have been disclosed, it will be understood that it is not limited thereto but may be otherwise embodied within the scope of the following claims.

What is claimed is:

1. A remotely maintainable modular servo manipulator having an anthropomorphic stance, comprising:
   central support means for supporitng the servo manipulator;
   a plurality of substantially identical motor modules;
   a gear pod module supporting and driven by said motor modules;
   a roll sleeve module capable of providing shoulder roll movements attached to said gear pod module;
   a shoulder module capable of shoulder pitch movements supporting said roll sleeve module, said shoulder module being attached to and supported by said central support means;
   a shoulder drive pod assembly attached to said shoulder module for providing rotary motive power thereto;
   an elbow module capable of pitch movement attached to said roll sleeve module;
   a wrist module capable of yaw, pitch, and roll motions attached to said elbow module, and;
   a tong attached to said wrist module;
   said tong and said wrist, elbow, sleeve and shoulder modules being interconnected through gear and torque tube power transmission means for transmitting power from individual motor modules to said tong and said wrist, elbow, sleeve and shoulder modules while facilitating remote disassembly and replacement of said tong and modules by having easily separable joints between all adjacent modules.

2. The manipulator of claim 1, wherein said gear pod module includes at least 6 gear paths; a housing member for housing said gear paths; and
   at least one pair of concentric shafts, each of which is independently driven by separate ones of said gear paths; each of said gear paths having an input gear adapted to receive rotary motive power from one of said motor modules.

3. The manipulator of claim 1 wherein said roll sleeve module comprises:
   an outer cylindrical wall attached to said shoulder module and movable therewith during shoulder pitch operations;
   an inner cylindrical member rotatably mounted within said outer cylindrical member, said inner cylindrical member being attached to and rotatable with said gear pod module at its upper end and said elbow module at its lower end; and
   an internal gear attached to said outer cylindrical wall, said internal gear being engaged by a pinion gear driven by one of said motor modules in said gear pod module to effect rotation of said gear pod module and said inner cylindrical member attached thereto.

4. An advanced servo manipulator, comprising:
   a central support member;
   a shoulder module connected to said central support member, said shoulder module having motor modules attached thereto for supplying rotary motive power thereto;

a roll sleeve module connected to said shoulder module for rotation thereby;

a gear pod module adapted to selectively rotate relative to an outer portion of said roll sleeve module, said gear pod module having a means for transmitting rotary power to an elbow module;

an elbow module having means for receiving rotary motive power from said gear pod module to control elbow pitch and to provide motive power to a wrist module attached to said elbow module;

a wrist module having means for receiving rotary motive power from said elbow module to control wrist yaw, roll and pitch motions and to operate a tong attached to said wrist module;

said respective tong, wrist, elbow, sleeve, and shoulder modules being interconnected through gear and torque tube power transmission means for transmitting power from individual motor modules to said tong, wrist, elbow, sleeve, and shoulder modules while facilitating remote disassembly and replacement of said tong modules by having easily separable joints between all adjacent modules.

* * * * *